United States Patent
Liu et al.

(10) Patent No.: US 12,335,925 B2
(45) Date of Patent: Jun. 17, 2025

(54) RESOURCE CONFIGURATION METHOD AND APPARATUS FOR IAB NODES

(71) Applicant: HUAWEI TECHNOLOGIES CO., LTD., Shenzhen (CN)

(72) Inventors: Fengwei Liu, Chengdu (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/886,801

(22) Filed: Aug. 12, 2022

(65) Prior Publication Data

US 2022/0394679 A1 Dec. 8, 2022

Related U.S. Application Data

(63) Continuation of application No. PCT/CN2020/075357, filed on Feb. 14, 2020.

(51) Int. Cl.
| | |
|---|---|
| *H04W 4/00* | (2018.01) |
| *H04W 72/04* | (2023.01) |
| *H04W 72/20* | (2023.01) |
| *H04W 72/53* | (2023.01) |

(52) U.S. Cl.
CPC ........... *H04W 72/04* (2013.01); *H04W 72/53* (2023.01); *H04W 72/20* (2023.01)

(58) Field of Classification Search
CPC ..... H04W 72/04; H04W 72/53; H04W 72/20; H04W 72/51
See application file for complete search history.

(56) References Cited

U.S. PATENT DOCUMENTS

| | | | |
|---|---|---|---|
| 2019/0159277 A1 | 5/2019 | Zhu et al. | |
| 2019/0342904 A1 | 11/2019 | Islam et al. | |
| 2019/0349079 A1 | 11/2019 | Novlan et al. | |
| 2021/0367660 A1* | 11/2021 | Jo | H04B 7/15542 |
| 2022/0104104 A1* | 3/2022 | Harada | H04W 48/16 |
| 2022/0167331 A1* | 5/2022 | Huang | H04W 72/20 |
| 2022/0182977 A1* | 6/2022 | Miao | H04W 72/51 |

(Continued)

FOREIGN PATENT DOCUMENTS

| | | |
|---|---|---|
| CN | 110121191 A | 8/2019 |
| CN | 110138526 A | 8/2019 |
| CN | 110149711 A | 8/2019 |

(Continued)

OTHER PUBLICATIONS

3GPP TS 38.213 V16.0.0 (Dec. 2019), 3rd Generation Partnership Project; Technical Specification Group Radio Access Network; NR; Physical layer procedures for control(Release 16), 146 pages.

(Continued)

*Primary Examiner* — Abdelnabi O Musa
(74) *Attorney, Agent, or Firm* — HAUPTMAN HAM, LLP

(57) ABSTRACT

This application provides a resource configuration method and a communication apparatus. In the technical solutions of this application, a donor node may configure different DU resource configurations for an IAB node and two parent nodes of the IAB, so that the IAB node can determine MT resources for different parent nodes based on the different DU resource configurations, to implement resource configuration of the IAB node in a dual connectivity scenario.

20 Claims, 9 Drawing Sheets

(56) References Cited

U.S. PATENT DOCUMENTS

| | | | | |
|---|---|---|---|---|
| 2022/0322249 A1* | 10/2022 | Liu | ................ | H04W 52/365 |
| 2022/0361174 A1* | 11/2022 | Liu | ................ | H04W 72/0453 |

FOREIGN PATENT DOCUMENTS

| | | | |
|---|---|---|---|
| CN | 110351836 A | 10/2019 | |
| CN | 110401515 A | 11/2019 | |
| CN | 110536351 A | 12/2019 | |
| CN | 110636612 A | 12/2019 | |
| CN | 110691416 A | 1/2020 | |
| CN | 111972019 A | 11/2020 | |
| WO | 2020032580 A1 | 2/2020 | |

OTHER PUBLICATIONS

3GPP TS 38.473 V16.0.0 (Dec. 2019), 3rd Generation Partnership Project; Technical Specification Group Radio Access Network; NG-RAN; F1 application protocol (F1AP)(Release 16), 239 pages.

3GPP TS 38.423 V16.0.0 (Dec. 2019), 3rd Generation Partnership Project; Technical Specification Group Radio Access Network; NG-RAN; Xn application protocol (XnAP)(Release 16), 330 pages.

International Search Report issued in corresponding International Application No. PCT/CN2020/075357, mailed Apr. 15, 2020, pp. 1-10.

Chinese Office Action issued in corresponding Chinese Application No. 202080096520.0, dated Jun. 6, 2024, pp. 1-15.

Ericsson: "IAB resource configuration and multiplexing", 3GPP Draft; R1-1906588, May 13, 2019, XP051728039, total 9 pages.

NTT Docomo et al: "Mechanisms for resource multiplexing among backhaul and access links", 3GPP Draft; R1-1900960,total 6 pages.

Extended European Search Report issued in corresponding European Application No. 20918981.0, dated Feb. 24. 2023, pp. 1-10.

Huawei, HiSilicon, Resource multiplexing between backhaul and access in IAB. 3GPP TSG RAN WG1 Meeting #96bis, Xi an, China, Apr. 8 12, 2019, R1-1903938, 12 pages.

Chinese Office Action issued in corresponding Chinese Application No. 202080096520.0, dated Jan. 26, 2024, pp. 1-27.

* cited by examiner

First resource configuration

Second resource configuration

Third resource configuration

RESOURCE CONFIGURATION METHOD AND APPARATUS FOR IAB NODES

CROSS-REFERENCE TO RELATED APPLICATIONS

This application is a continuation of International Application No. PCT/CN2020/075357, filed on Feb. 14, 2020, the disclosure of which is hereby incorporated by reference in its entirety.

BACKGROUND

With continuous development of mobile communication technologies, spectrum resources are increasingly strained. Base stations will be deployed more densely in the future to improve spectrum utilization. In addition, dense deployment may further avoid coverage holes. In a conventional cellular network architecture, a base station is connected to a core network through an optical fiber. However, fiber deployment is costly in many scenarios. A wireless relay node (relay node, RN) establishes a connection to the core network through a wireless backhaul link, to reduce some optical fiber deployment costs.

Usually, the relay node establishes a wireless backhaul link to one or more parent nodes, and accesses the core network through the parent node. The parent node controls (for example, perform data scheduling, timing modulation, or power control on) the relay node by using a plurality of types of signaling. In addition, the relay node provides a service for a plurality of child nodes. The parent node of the relay node is a base station or another relay node. The child node of the relay node is a terminal or another relay node.

In 5G new radio (new radio, NR), an integrated access and backhaul (integrated access and backhaul, IAB) solution is considered to be introduced to further reduce deployment costs and improve deployment flexibility. Therefore, an integrated access and backhaul relay node, namely, an IAB node, is introduced. However, in a multi-hop IAB network, a parent backhaul link of an IAB node may not be stable due to load imbalance, link blocking, and the like.

To resolve the foregoing problem, a dual connectivity technology is introduced into the IAB network, that is, a redundant link is introduced, to improve robustness of the parent backhaul link of the IAB node and implement load balancing. However, in a dual connectivity scenario, there is no solution for performing resource configuration on the IAB node yet.

SUMMARY

In view of this, at least one embodiment provides a resource configuration method and a communication apparatus, to implement resource configuration of an IAB node in a dual connectivity scenario.

According to a first aspect, at least one embodiment provides a resource configuration method. The method includes: A first node receives first configuration information and second configuration information from a donor node, where the first configuration information corresponds to a first parent node of the first node, the second configuration information corresponds to a second parent node of the first node, the first configuration information indicates a resource type of a distributed unit DU of the first node, the second configuration information indicates the resource type of the DU of the first node, and the resource type is a hard resource, a soft resource, or an unavailable resource. The first node determines a first resource based on the first configuration information, where the first resource is a resource for communication between a mobile termination MT of the first node and the first parent node. The first node determines a second resource based on the second configuration information, where the second resource is a resource for communication between the MT of the first node and the second parent node.

Optionally, the first node is an IAB node or a terminal device.

In the foregoing technical solution, two different DU resource configurations are configured, so that the IAB node determines MT resources for different parent nodes based on the different DU resource configurations, to implement resource configuration of the IAB node in a dual connectivity scenario.

With reference to the first aspect, in at least one embodiment, the first resource and the second resource meet time division multiplexing or time domain orthogonalization in time domain.

In this way, communication between the first node and different parent nodes do not interfere with each other.

With reference to any one of the first aspect and the foregoing implementations, in at least one embodiment, the first configuration information indicates that a resource type of the DU in first time domain is a first type, the second configuration information indicates that the resource type of the DU in first time domain is a second type, and the first type is different from the second type.

In other words, the first configuration information is different from the second configuration information. In this way, the first resource determined by the IAB node based on the first configuration information is different from the second resource determined by the IAB node based on the second configuration information, so that a probability of a resource conflict is reduced.

With reference to any one of the first aspect and the foregoing implementations, in at least one embodiment, the method further includes: The first node determines the resource type of the DU based on the first configuration information and the second configuration information.

Because the first node receives two pieces of configuration information of the DU of the first node: the first configuration information and the second configuration information, the IAB node needs to determine an actual resource type of the DU based on both the first configuration information and the second configuration information.

With reference to any one of the first aspect and the foregoing implementations, in at least one embodiment, that the first node determines the resource type of the DU based on the first configuration information and the second configuration information includes: In response to both the first configuration information and the second configuration information indicating that a resource type of the DU in second time domain is the hard resource, the first node determines that the resource type of the DU unit in second time domain is the hard resource.

With reference to any one of the first aspect and the foregoing implementations, in at least one embodiment, that the first node determines the resource type of the DU based on the first configuration information and the second configuration information includes: In response to the first configuration information indicating that a resource type of the DU in third time domain is the soft resource, and the second configuration information indicates that the resource type of the DU in third time domain is the hard resource or the soft resource, the first node determines that the resource type of the DU in third time domain is the soft resource. Alternatively, in response to the second configuration information indicating that a resource type of the DU in third time domain is the soft resource, and the first configuration information indicates that the resource type of the DU in third time domain is the hard resource or the soft resource, the first node determines that the resource type of the DU in third time domain is the soft resource.

With reference to any one of the first aspect and the foregoing implementations, in at least one embodiment, that the first node determines the resource type of the DU based on the first configuration information and the second configuration information includes: In response to at least one of the first configuration information and the second indication information indicating that a resource type of the DU in fourth time domain is the unavailable resource, the first node determines that the resource type of the DU in fourth time domain is the unavailable resource.

With reference to any one of the first aspect and the foregoing implementations, in at least one embodiment, the method further includes: The first node sends first information and second information. The first information indicates a multiplexing capability between a carrier of the mobile termination MT of the first node and a cell of the distributed unit DU of the first node, and an identifier of the first parent node of the first node. The second information indicates the multiplexing capability between the carrier of the MT of the first node and the cell of the DU of the first node, and an identifier of the second parent node of the first node.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to any one of the first aspect and the foregoing implementations, in at least one embodiment, the multiplexing capabilities include a first capability, a second capability, a third capability, a fourth capability, and a fifth capability. The first capability indicates that signal sending of the MT and signal sending of the DU is simultaneously implemented. The second capability indicates that signal sending of the MT and signal receiving of the DU is simultaneously implemented. The third capability indicates that signal receiving of the MT and signal sending of the DU is simultaneously implemented. The fourth capability indicates that signal receiving of the MT and signal receiving of the DU is simultaneously implemented. The fifth capability indicates that signal receiving or sending of the MT and signal receiving or sending of the DU cannot be simultaneously implemented.

With reference to any one of the first aspect and the foregoing implementations, in at least one embodiment, the method further includes: The first node sends third information, where the third information indicates multiplexing types of a first link and a second link. The first link is a communication link between the MT of the first node and the first parent node. The second link is a communication link between the MT of the first node and the second parent node.

The first node reports the third information, so that communication performed by the first node with different parent nodes through different antenna panels does not affect each other.

With reference to any one of the first aspect and the foregoing implementations, in at least one embodiment, the multiplexing types include time division multiplexing TDM, space division multiplexing SDM, dynamic SDM, and full-duplex multiplexing.

With reference to any one of the first aspect and the foregoing implementations, in at least one embodiment, the third information includes a multiplexing type of a master cell group MCG of the MT and a multiplexing type of a secondary cell group SCG of the MT.

According to a second aspect, at least one embodiment provides a resource configuration method. The method includes: A donor node determines first configuration information and second configuration information, where the first configuration information corresponds to a first parent node of a first node, the second configuration information corresponds to a second parent node of the first node, the first configuration information indicates a resource type of a distributed unit DU of the first node, the second configuration information indicates the resource type of the DU of the first node, and the resource type is a hard resource, a soft resource, or an unavailable resource. The donor node sends the first configuration information and the second configuration information.

Optionally, the first node is an IAB node or a terminal device.

In the foregoing technical solution, two different DU resource configurations are configured, so that the IAB node determines MT resources for different parent nodes based on the different DU resource configurations, to implement resource configuration of the IAB node in a dual connectivity scenario.

With reference to the second aspect, in at least one embodiment, the first resource and the second resource meet time division multiplexing or time domain orthogonalization in time domain.

In this way, communication between the first node and different parent nodes do not interfere with each other.

With reference to any one of the second aspect and the foregoing implementations, in at least one embodiment, the first configuration information indicates that a resource type of the DU in first time domain is a first type, the second configuration information indicates that the resource type of the DU in first time domain is a second type, and the first type is different from the second type.

In other words, the first configuration information is different from the second configuration information. In this way, the first resource determined by the IAB node based on the first configuration information is different from the second resource determined by the IAB node based on the second configuration information, so that a probability of a resource conflict is reduced.

With reference to any one of the second aspect and the foregoing implementations, in at least one embodiment, the method further includes: The donor node receives first information and second information from the first node. The first information indicates a multiplexing capability between a carrier of a mobile termination MT of the first node and a cell of the distributed unit DU of the first node, and an identifier of the first parent node of the first node. The second information indicates the multiplexing capability between the carrier of the MT of the first node and the cell of the DU of the first node, and an identifier of the second parent node of the first node.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to any one of the second aspect and the foregoing implementations, in at least one embodiment, the multiplexing capabilities include a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU are simultaneously implemented. The fifth capability indicates that signal receiving or sending of the MT and signal receiving or sending of the DU cannot be simultaneously implemented.

With reference to any one of the second aspect and the foregoing implementations, in at least one embodiment, the method further includes: The donor node receives third information from the first node, where the third information indicates multiplexing types of a first link and a second link. The first link is a communication link between the MT of the first node and the first parent node. The second link is a communication link between the MT of the first node and the second parent node.

The first node reports the third information, so that communication performed by the first node with different parent nodes through different antenna panels does not affect each other.

With reference to any one of the second aspect and the foregoing implementations, in at least one embodiment, the multiplexing types include time division multiplexing TDM, space division multiplexing SDM, dynamic SDM, and full-duplex multiplexing.

With reference to any one of the second aspect and the foregoing implementations, in at least one embodiment, the third information includes a multiplexing type of a master cell group MCG of the MT and a multiplexing type of a secondary cell group SCG of the MT.

According to a third aspect, at least one embodiment provides a resource configuration method. The method includes: A first node determines first information and second information. The first information indicates a multiplexing capability between a carrier of a mobile termination MT of the first node and a cell of a distributed unit DU of the first node, and an identifier of a first parent node of the first node. The second information indicates the multiplexing capability between the carrier of the MT of the first node and the cell of the DU of the first node, and an identifier of a second parent node of the first node. The first node sends the first information and the second information.

Optionally, the first node is an IAB node or a terminal device.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to the third aspect, in at least one embodiment, the multiplexing capability is any one of a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU are simultaneously implemented. The fifth capability indicates that signal receiving or sending of the MT and signal receiving or sending of the DU cannot be simultaneously implemented.

With reference to any one of the third aspect and the foregoing implementations, in at least one embodiment, the method further includes: The first node sends third information, where the third information indicates multiplexing types of a first link and a second link. The first link is a communication link between the MT of the first node and the first parent node. The second link is a communication link between the MT of the first node and the second parent node.

The first node reports the third information, so that communication performed by the first node with different parent nodes through different antenna panels does not affect each other.

With reference to any one of the third aspect and the foregoing implementations, in at least one embodiment, the multiplexing type is any one of time division multiplexing TDM, space division multiplexing SDM, dynamic SDM, and full-duplex multiplexing.

With reference to any one of the third aspect and the foregoing implementations, in at least one embodiment, the third information includes a multiplexing type of a master cell group MCG of the MT and a multiplexing type of a secondary cell group SCG of the MT.

With reference to any one of the third aspect and the foregoing implementations, in at least one embodiment, the identifier of the first parent node is represented as a cell group ID, a radio network temporary identifier RNTI, or an identifier of the MT connected to the first parent node.

According to a fourth aspect, at least one embodiment provides a resource configuration method. The method includes: A donor node receives first information and second information sent by a first node. The first information indicates a multiplexing capability between a carrier of a mobile termination MT of the first node and a cell of a distributed unit DU of the first node, and an identifier of a first parent node of the first node. The second information indicates the multiplexing capability between the carrier of the MT of the first node and the cell of the DU of the first node, and an identifier of a second parent node of the first node. The donor node performs resource configuration on the first node based on the first information and the second information.

Optionally, the first node is an IAB node or a terminal device.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to the fourth aspect, in at least one embodiment, the multiplexing capability is any one of a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU are simultaneously implemented. The fifth capability indicates that signal receiving or sending of the MT and signal receiving or sending of the DU cannot be simultaneously implemented.

With reference to any one of the fourth aspect and the foregoing implementations, in at least one embodiment, the method further includes: The donor node receives third information from the first node, where the third information indicates multiplexing types of a first link and a second link. The first link is a communication link between the MT of the first node and the first parent node. The second link is a communication link between the MT of the first node and the second parent node.

The first node reports the third information, so that communication performed by the first node with different parent nodes through different antenna panels does not affect each other.

With reference to any one of the fourth aspect and the foregoing implementations, in at least one embodiment, the multiplexing type is any one of time division multiplexing TDM, space division multiplexing SDM, dynamic SDM, and full-duplex multiplexing.

With reference to any one of the fourth aspect and the foregoing implementations, in at least one embodiment, the third information includes a multiplexing type of a master cell group MCG of the MT and a multiplexing type of a secondary cell group SCG of the MT.

With reference to any one of the fourth aspect and the foregoing implementations, in at least one embodiment, the identifier of the first parent node is represented as a cell group ID, a radio network temporary identifier RNTI, or an identifier of the MT connected to the first parent node.

According to a fifth aspect, at least one embodiment provides a resource configuration method. The method includes: A first node receives fourth configuration information, first indication information, and second indication information. The fourth configuration information indicates a resource type of a distributed unit DU of the first node. The first indication information indicates a time domain position of an unavailable resource for a DU of a first parent node of the first node. The second indication information indicates a time domain position of an unavailable resource for a DU of a second parent node of the first node. The first node determines a third resource based on the fourth configuration information and the first indication information, where the third resource is a resource for communication between a mobile termination MT of the first node and the first parent node. The first node determines a fourth resource based on the fourth configuration information and the second indication information, where the fourth resource is a resource for communication between the MT of the first node and the second parent node.

Optionally, the first node is an IAB node or a terminal device.

In the foregoing technical solution, by using the additionally received first indication information and second indication information, the first node is enabled to determine DU resource configurations for different parent nodes, and further determine MT resources for the different parent nodes based on the different DU resource configurations, to implement resource configuration of the IAB node in a dual connectivity scenario.

With reference to the fifth aspect, in at least one embodiment, the first indication information indicates that a resource type of the DU in fifth time domain is the unavailable resource, and the second indication information indicates that a resource type of the DU in sixth time domain is the unavailable resource.

With reference to any one of the fifth aspect and the foregoing implementations, in at least one embodiment, the method further includes: The first node sends first information and second information. The first information indicates a multiplexing capability between a carrier of the mobile termination MT of the first node and a cell of the distributed unit DU of the first node, and an identifier of the first parent node of the first node. The second information indicates the multiplexing capability between the carrier of the MT of the first node and the cell of the DU of the first node, and an identifier of the second parent node of the first node.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to any one of the fifth aspect and the foregoing implementations, in at least one embodiment, the multiplexing capability is any one of a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU are simultaneously implemented. The fifth capability indicates that signal receiving or sending of the MT and signal receiving or sending of the DU cannot be simultaneously implemented.

With reference to any one of the fifth aspect and the foregoing implementations, in at least one embodiment, the method further includes: The first node sends third information, where the third information indicates multiplexing types of a first link and a second link. The first link is a communication link between the MT of the first node and the first parent node. The second link is a communication link between the MT of the first node and the second parent node.

The first node sends the third information, so that communication performed by the first node with different parent nodes through different antenna panels does not affect each other.

With reference to any one of the fifth aspect and the foregoing implementations, in at least one embodiment, the multiplexing type is any one of time division multiplexing TDM, space division multiplexing SDM, dynamic SDM, and full-duplex multiplexing.

With reference to any one of the fifth aspect and the foregoing implementations, in at least one embodiment, the third information includes a multiplexing type of a master cell group MCG of the MT and a multiplexing type of a secondary cell group SCG of the MT.

With reference to any one of the fifth aspect and the foregoing implementations, in at least one embodiment, the identifier of the first parent node is represented as a cell group ID, a radio network temporary identifier RNTI, or an identifier of the MT connected to the first parent node.

According to a sixth aspect, at least one embodiment provides a resource configuration method. The method includes: A donor node determines fourth configuration information, first indication information, and second indication information. The fourth configuration information indicates a resource type of a distributed unit DU of a first node. The first indication information indicates a time domain position of an unavailable resource for a DU of a first parent node of the first node. The second indication information indicates a time domain position of an unavailable resource for a DU of a second parent node of the first node. The donor node sends the fourth configuration information, the first indication information, and the second indication information.

Optionally, the first node is an IAB node or a terminal device.

In the foregoing technical solution, the donor node additionally determines and sends the first indication information and the second indication information, so that the first node determines DU resource configurations for different parent nodes, and further determine MT resources for the different parent nodes based on the different DU resource configurations, to implement resource configuration of the IAB node in a dual connectivity scenario.

With reference to the sixth aspect, in at least one embodiment, the first indication information indicates that a resource type of the DU in fifth time domain is the unavailable resource, and the second indication information indicates that a resource type of the DU in sixth time domain is the unavailable resource.

With reference to any one of the sixth aspect and the foregoing implementations, in at least one embodiment, the method further includes: The donor node receives first information and second information from the first node. The first information indicates a multiplexing capability between a carrier of a mobile termination MT of the first node and a cell of the distributed unit DU of the first node, and an identifier of the first parent node of the first node. The second information indicates the multiplexing capability between the carrier of the MT of the first node and the cell of the DU of the first node, and an identifier of the second parent node of the first node.

In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. In the foregoing technical solution, the first node determines and reports the multiplexing capabilities that are for the different parent nodes and that are between the component carriers of the MT and the cell of the DU, so that the donor node or a parent node obtains more accurate multiplexing capability information.

With reference to any one of the sixth aspect and the foregoing implementations, in at least one embodiment, the multiplexing capability is any one of a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU are simultaneously implemented. The fifth capability indicates that signal receiving or sending of the MT and signal receiving or sending of the DU cannot be simultaneously implemented.

With reference to any one of the sixth aspect and the foregoing implementations, in at least one embodiment, the method further includes: The donor node receives third information from the first node, where the third information indicates multiplexing types of a first link and a second link. The first link is a communication link between the MT of the first node and the first parent node. The second link is a communication link between the MT of the first node and the second parent node.

The first node reports the third information, so that communication performed by the first node with different parent nodes through different antenna panels does not affect each other.

With reference to any one of the sixth aspect and the foregoing implementations, in at least one embodiment, the multiplexing type is any one of time division multiplexing TDM, space division multiplexing SDM, dynamic SDM, and full-duplex multiplexing.

With reference to any one of the sixth aspect and the foregoing, the third information includes a multiplexing type of a master cell group MCG of the MT and a multiplexing type of a secondary cell group SCG of the MT.

With reference to any one of the sixth aspect and the foregoing implementations, in at least one embodiment, the identifier of the first parent node is represented as a cell group ID, a radio network temporary identifier RNTI, or an identifier of the MT connected to the first parent node.

According to a seventh aspect, at least one embodiment provides a resource configuration method. The method includes: A first parent node receives fourth configuration information and first indication information from a donor node. The fourth configuration information indicates a resource type of a distributed unit DU of a first node. The first indication information indicates a time domain position of an unavailable resource for a DU of the first parent node of the first node. The donor node determines a third resource based on the fourth configuration information and the first indication information, where the third resource is a resource for communication between a mobile termination MT of the first node and the first parent node.

Optionally, the first node is an IAB node or a terminal device.

With reference to the seventh aspect, in at least one embodiment, the first indication information indicates that a resource type of the DU in fifth time domain is the unavailable resource.

According to an eighth aspect, at least one embodiment provides a communication apparatus, including a module configured to perform any one of the first aspect or the implementations of the first aspect, a module configured to perform any one of the third aspect or the implementations of the third aspect, or a module configured to perform any one of the fifth aspect or the implementations of the fifth aspect.

In at least one embodiment, the communication apparatus includes a processor. The processor is connected to a memory, and is configured to read and execute a software program stored in the memory, to implement the method according to any one of the first aspect or the implementations of the first aspect, the method according to any one of the third aspect or the implementations of the third aspect, or the method according to any one of the fifth aspect or the implementations of the fifth aspect.

In at least one embodiment, the communication apparatus further includes a transceiver.

In at least one embodiment, the communication apparatus is a chip that is applied to a first node.

In at least one embodiment, the communication apparatus is an IAB node or a terminal device.

According to a ninth aspect, at least one embodiment provides a communication apparatus, including a module configured to perform any one of the second aspect or the implementations of the second aspect, a module configured to perform any one of the fourth aspect or the implementations of the fourth aspect, or a module configured to perform any one of the sixth aspect or the implementations of the sixth aspect.

In at least one embodiment, the communication apparatus includes a processor. The processor is connected to a memory, and is configured to read and execute a software program stored in the memory, to implement the method according to any one of the second aspect or the implementations of the second aspect, the method according to any one of the fourth aspect or the implementations of the fourth aspect, or the method according to any one of the sixth aspect or the implementations of the sixth aspect.

In at least one embodiment, the communication apparatus further includes a transceiver.

In at least one embodiment, the communication apparatus is a chip that is applied to a donor node.

In at least one embodiment, the communication apparatus is a donor node.

According to a tenth aspect, at least one embodiment provides a communication apparatus, including a module configured to perform any one of the seventh aspect or the implementations of the seventh aspect.

In at least one embodiment, the communication apparatus includes a processor. The processor is connected to a memory, and is configured to read and execute a software program stored in the memory, to implement the method according to any one of the seventh aspect or the implementations of the seventh aspect.

In at least one embodiment, the communication apparatus further includes a transceiver.

In at least one embodiment, the communication apparatus is a chip that is applied to a first parent node.

In at least one embodiment, the communication apparatus is a donor node or an IAB node.

According to an eleventh aspect, at least one embodiment provides a computer program product, where the computer program product includes computer instructions. In response to the computer instructions being executed, the method according to any one of the first aspect or the implementations of the first aspect is performed;

the method according to any one of the second aspect or the implementations of the second aspect is performed;

the method according to any one of the third aspect or the implementations of the third aspect is performed;

the method according to any one of the fourth aspect or the implementations of the fourth aspect is performed;

the method according to any one of the fifth aspect or the implementations of the fifth aspect is performed;

the method according to any one of the sixth aspect or the implementations of the sixth aspect is performed; or the method according to any one of the seventh aspect or the implementations of the seventh aspect is performed.

According to a twelfth aspect, at least one embodiment provides a computer-readable storage medium, where the storage medium stores computer instructions. In response to the computer instructions being executed, the method according to any one of the first aspect or the implementations of the first aspect is performed;

the method according to any one of the second aspect or the implementations of the second aspect is performed;

the method according to any one of the third aspect or the implementations of the third aspect is performed;

the method according to any one of the fourth aspect or the implementations of the fourth aspect is performed;

the method according to any one of the fifth aspect or the implementations of the fifth aspect is performed;

the method according to any one of the sixth aspect or the implementations of the sixth aspect is performed; or the method according to any one of the seventh aspect or the implementations of the seventh aspect is performed.

According to a thirteenth aspect, at least one embodiment provides a communication system. The communication system includes the communication apparatus according to the eighth aspect, and/or the communication apparatus according to the ninth aspect, and/or the communication apparatus according to the tenth aspect.

DESCRIPTION OF EMBODIMENTS

The following describes the technical solutions with reference to the accompanying drawings.

Names of nodes and messages in at least one embodiment are merely names set for ease of description, and is different in an actual network. the names of the nodes and the messages are limited in at least one embodiment. Any name that has a function the same as or similar to that of the node or the message used in at least one embodiment is considered as a method or an equivalent replacement, and falls within the protection scope of at least one embodiment. Details are not described below again.

In consideration of a high bandwidth of a future wireless network, an integrated access and backhaul (integrated access and backhaul, IAB) solution is considered to be introduced into 5th generation (5th generation, 5G) new radio (new radio, NR) or a next generation communication system, to further reduce deployment costs and improve deployment flexibility. Therefore, an integrated access and backhaul relay is introduced. In at least one embodiment, a relay node that supports integrated access and backhaul is referred to as an IAB node (IAB node), so that the integrated access and backhaul relay is distinguished from a long term evolution (long term evolution, LTE) relay. A system including the IAB node is also referred to as a relay system.

Figure 1:
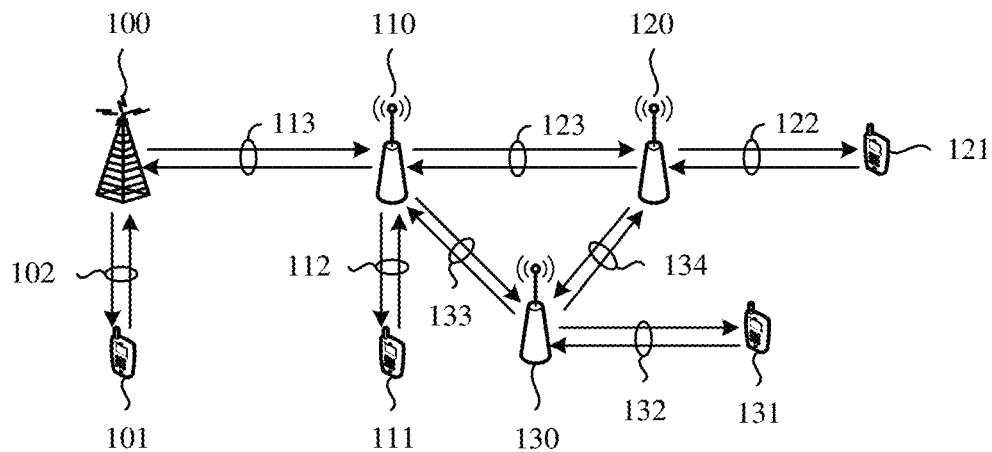
FIG. 1 is a schematic diagram of a structure of an integrated access and backhaul IAB system according to at least one embodiment.

To better understand a resource configuration method and a communication apparatus that are disclosed in at least one embodiment, the following first describes an integrated access and backhaul IAB system. FIG. 1 is a schematic diagram of a structure of an integrated access and backhaul IAB system according to at least one embodiment.

A communication system mentioned in at least one embodiment includes but is not limited to a narrowband internet of things (narrowband internet of things, NB-IoT) system, a wireless local area network (wireless local access network, WLAN) system, an LTE system, a next generation 5G mobile communication system, or a communication system after 5G, such as 6G, a device to device (device to device, D2D) communication system, or internet of vehicles.

In the communication system shown in FIG. 1, the integrated access and backhaul IAB system is provided. The IAB system includes at least one base station 100, one or more terminal (terminal) devices 101 served by the base station 100, one or more relay nodes IAB nodes, and one or more terminal devices 111 served by the IAB node 110. Usually, the base station 100 is referred to as a donor base station (donor next generation NodeB, DgNB), and the IAB node 110 is connected to the base station 100 over a wireless backhaul link 113. The donor base station is also referred to as a donor node in at least one embodiment. The base station includes but is not limited to: an evolved NodeB (evolved node base, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband Unit, BBU), an eLTE (evolved LTE, eLTE) base station, an NR base station (next-generation NodeB, gNB), a transmission reception point (Transmission Reception Point, TRP), a transmission point (Transmission Point, TP), and the like. The terminal device includes but is not limited to any one of user equipment (user equipment, UE), a mobile station, an access terminal, a subscriber unit, a subscriber station, a mobile station, a remote station, a remote terminal, a mobile device, a terminal, a wireless communication device, a user agent, a station (station, ST) in a wireless local area network (wireless local access network, WLAN), a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a mobile station in a future 5G network, and a terminal device in a future evolved public land mobile network (public land mobile network, PLMN) network. The IAB node is a specific name of a relay node, and does not constitute any limitation on the solutions in at least one embodiment. The IAB node is one of the foregoing base stations or terminal devices that have a forwarding function, or is in an independent device form.

The integrated access and backhaul system further includes a plurality of other IAB nodes, for example, an IAB node 120 and an IAB node 130. The IAB node 120 is connected to the IAB node 110 over a wireless backhaul link 123, to access a network. The IAB node 130 is connected to the IAB node 110 over a wireless backhaul link 133, to access the network. The IAB node 120 serves one or more terminal devices 121. The IAB node 130 serves one or more terminal devices 131. In FIG. 1, both the IAB node 110 and the IAB node 120 are connected to the network over wireless backhaul links. In at least one embodiment, the wireless backhaul links are viewed from a perspective of the relay node. For example, the wireless backhaul link 113 is a backhaul link of the IAB node 110, and the wireless backhaul link 123 is a backhaul link of the IAB node 120. As shown in FIG. 1, one IAB node such as the IAB node 120 is connected to another IAB node 110 over a wireless backhaul link such as the wireless backhaul link 123, to access the network. In addition, the relay node is connected to the network through a multi-hop wireless relay node. In at least one embodiment, the IAB node is used only for a purpose of description, and does not indicate that the solutions of at least one embodiment are used only in an NR scenario. In at least one embodiment, the IAB node is any node or device that has a relay function. Use of the IAB node and use of the relay node in at least one embodiment have a same meaning.

For ease of description, the following defines basic terms or concepts used in at least one embodiment.

Parent node: A node, such as the IAB node 110, that provides a wireless backhaul link resource is referred to as a parent node of the IAB node 120. The parent node is an IAB node, a donor base station (for example, a donor node), a network device, or the like. This is not limited.

Child node: A node that transmits data to a network by using a backhaul link resource or receives data from a network is referred to as a child node. For example, the IAB node 120 is referred to as a child node of the relay node 110, and the terminal device 131 is referred to as a child node of the IAB node 130. The network is a network, such as the Internet or a dedicated network, that is above a core network or another access network. Usually, a child node is considered as a terminal device of a parent node.

Access link: An access link is a wireless link used by a node to communicate with a child node of the node, and includes an uplink transmission link and a downlink transmission link. Uplink transmission on the access link is also referred to as uplink transmission of the access link, and downlink transmission on the access link is also referred to as downlink transmission of the access link. The node includes but is not limited to the foregoing IAB node.

Backhaul link: A backhaul link is a wireless link used by a node to communicate with a parent node of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the foregoing IAB node.

Figure 2:
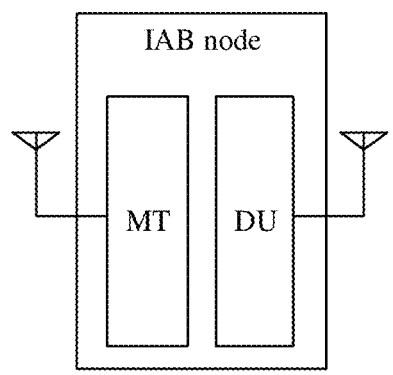
FIG. 2 is a schematic diagram of a structure of an IAB node according to at least one embodiment according to at least one embodiment.

In another description, as shown in FIG. 2, an IAB node is divided into two parts, namely, a mobile termination (mobile terminal, MT) and a distributed unit (distributed unit, DU). The MT is used by the IAB node to communicate with a parent node, and the DU is used by the IAB node to communicate with a child node. A link between the MT in the IAB node and the parent node is referred to as a parent backhaul link (parent BackHaul link), a link between the DU in the IAB node and a child IAB node is referred to as a child backhaul link (child BackHaul link), and a link between the DU in the IAB node and subordinate UE is referred to as an access link (access link). However, in at least one embodiment, for ease of description, a link between the IAB node and a parent node is referred to as a backhaul link, and links between the IAB node and a child IAB node and/or UE are referred to as an access link.

In FIG. 1, wireless links 102, 112, 122, 132, 113, 123, 133, and 134 is bidirectional links, including uplink and downlink transmission links. Specifically, the wireless backhaul links 113, 123, 133, and 134 is used by a parent node to provide a service for a child node, for example, used by the parent node 100 to provide a wireless backhaul service for the child node 110. An uplink and a downlink of a backhaul link is separated, that is, transmission on the uplink and the downlink is not performed through a same node. The downlink transmission means that a parent node, such as the node 100, transmits information or data to a child node, such as the node 110. The uplink transmission means that a child node, such as the node 110, transmits information or data to a parent node, such as the node 100. The node is not limited to a network node or a terminal device. For example, in a D2D scenario, the terminal device acts as a relay node to serve another terminal device. For example, in an internet of vehicles scenario, a vehicle-mounted module serves as a relay node to serve another terminal device. In some scenarios, a wireless backhaul link is also an access link. For example, the backhaul link 123 is also considered as an access link for the node 110, and the backhaul link 113 is also an access link for the node 100. The parent node is a base station or a relay node, and the child node is a relay node or a terminal device having a relay function. For example, in the D2D scenario, the child node is also a terminal device.

The relay node shown in FIG. 1, such as the relay node 110, 120, or 130, exists in two forms: an independent access node, which independently manages a terminal device that accesses the relay node, usually has an independent physical cell identifier (physical cell identifier, PCI), and usually needs to have a complete protocol stack function, for example, a radio resource control (radio resource control, RRC) function, where this type of relay is usually referred to as a layer 3 relay; and a relay node or a donor node in another form, such as a donor eNB or a donor gNB, which belongs to a same cell, where a user is managed by a donor base station such as the donor node, and this type of relay is usually referred to as a layer 2 relay. In a control-bearer (central unit and Distributed unit, CU-DU) split architecture of NR, the layer 2 relay usually exists as a DU of a base station DgNB, and communicates with a CU through an F1 application protocol (F1 application protocol, F1-AP) interface or by using a tunneling protocol. The tunneling protocol is, for example, a general packet radio service tunneling protocol (general packet radio service tunneling protocol, GTP), and details are not described. The donor node is a node through which a core network is accessed, or is an anchor base station that is in a radio access network and through which the network is accessed. The anchor base station is responsible for receiving data from the core network and forwarding the data to a relay node, or receiving data from a relay node and forwarding the data to the core network. Usually, a donor node in a relay system is referred to as an IAB donor, namely, a donor node. In at least one embodiment, the two terms are used interchangeably. The IAB donor and the donor node are not to be understood as entities or network elements that have different functions.

In at least one embodiment, the relay node (for example, the IAB node), the terminal device, or the network device includes a hardware layer, an operating system layer running above the hardware layer, and an application layer running above the operating system layer. The hardware layer includes hardware such as a central processing unit (central processing unit, CPU), a memory management unit (memory management unit, MMU), and a memory (which is also referred to as a main memory). An operating system is any one or more of computer operating systems that implement service processing through a process (process), for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in at least one embodiment is not specifically limited, provided that a program that records code of the method provided in at least one embodiment is run to perform communication according to the method described herein. For example, the method provided in at least one embodiment is performed by the terminal device or the network device, or a function module that invokes and execute the program in the terminal device or the network device.

In addition, aspects or features of at least one embodiment are implemented as a method, an apparatus, or a product that uses standard programming and/or engineering technologies. The term "product" used in at least one embodiment covers a computer program that is accessed from any computer-readable component, carrier, or medium. For example, a computer-readable medium includes but is not limited to: a magnetic storage component (for example, a hard disk, a floppy disk, or a magnetic tape), an optical disc (for example, a compact disc (compact disc, CD) or a digital versatile disc (digital versatile disc, DVD)), a smart card and a flash memory component (for example, an erasable programmable read-only memory (erasable programmable read-only memory, EPROM), a card, a stick, or a key drive). In addition, various storage media described in this specification indicates one or more devices and/or other machine-readable media that are configured to store information. The term "machine-readable media" includes but is not limited to a wireless channel, and various other media that stores, includes, and/or carries instructions and/or data.

For ease of understanding, some terms or concepts in at least one embodiment are explained herein.

DU resource: A DU resource is a resource used by a DU function of an IAB node. The DU resource is configured as an uplink (uplink, U) resource, a downlink (downlink, D) resource, or a flexible (flexible, F) resource. Further, the uplink resource, the downlink resource, and the flexible resource for the DU is further classified into a soft (soft, S) resource, a hard (hard, H) resource, and an unavailable (not available) resource.

Soft resource: Whether a resource is used by the DU depends on an indication of a parent node.

Hard resource: A hard resource is a resource that is always available for the DU.

Unavailable resource: An unavailable resource is a resource that is always unavailable for the DU.

In at least one embodiment, the soft resource, the hard resource, and the unavailable resource for the DU is explicitly configured by the parent node by using higher layer signaling (for example, RRC signaling) or an interface message (for example, an F1-AP interface message or an enhanced F1-AP interface message).

MT resource: An MT resource is a resource used by an MT function of the IAB node. The MT resource is configured as an uplink (uplink, U) resource, a downlink (downlink, D) resource, or a flexible (flexible, F) resource.

In addition, the MT resource is further classified into the following two types of resources:

an available resource, which is a resource that is scheduled by a parent node; and an unavailable (null, N) resource, which is a resource that cannot be scheduled by the parent node, where a person skilled in the art understands that in actual use, the unavailable resource is also represented as "NULL", and this imposes no limitation on embodiments described herein.

Figure 3:
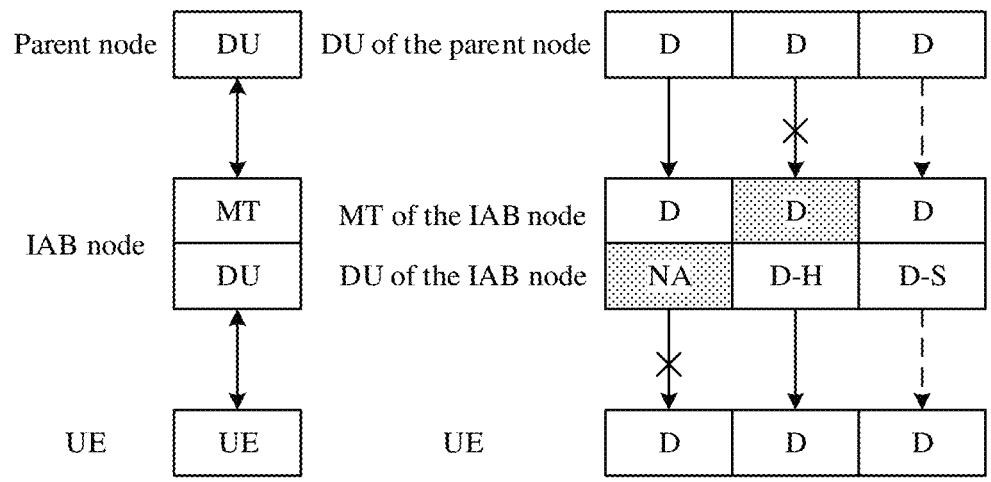
FIG. 3 shows an example of deducing a resource type of an MT.

In at least one embodiment, the available resource and the unavailable resource for the MT is implicitly deduced by the IAB node based on a resource type of the DU. FIG. 3 shows an example of deducing a resource type of an MT from a resource type of a DU.

As shown in FIG. 3, three time domain resources are used as an example. The resource types of the DU of an IAB node are an unavailable resource, a downlink hard resource, and a downlink soft resource. Because the resource type of the DU of the IAB node on the $1^{st}$ time domain resource is the unavailable resource, the DU of the IAB node does not use the time domain resource to transmit a signal with a child node. Therefore, the MT of the IAB node uses the $1^{st}$ time domain resource, that is, the resource type of the MT of the IAB node on the $1^{st}$ time domain resource is an available resource. Because the resource type of the DU of the IAB node on the $2^{nd}$ time domain resource is the downlink hard resource, the DU of the IAB node uses the time domain resource to transmit a signal with a child node. Therefore, the MT of the IAB node cannot use the $2^{nd}$ time domain resource, that is, the resource type of the MT of the IAB node on the $2^{nd}$ time domain resource is an unavailable resource. The resource type of the DU of the IAB node on the $3^{rd}$ time domain resource is the downlink soft resource. Therefore, a parent node needs to indicate whether the DU uses the time domain resource, and then whether the MT of the IAB node uses the time domain resource is further determined. The time domain resource is a time domain resource of any length, for example, is a slot, a symbol, or a subframe.

The parent node indicates availability of the soft resource for the DU of the IAB node by using dedicated downlink control information (downlink control information, DCI) (for example, DCI format 2_5). Table 1 shows an example in which DCI dynamically indicates a value and a meaning represented by the value. In Table 1, an example in which a time domain resource is a symbol is used.

TABLE 1

| Value | Indication |
|---|---|
| 0 | No symbol of a soft type is indicated as available. |
| 1 | A symbol of only a downlink soft type is indicated as available. |
| 2 | A symbol of only an uplink soft type is indicated as available. |
| 3 | Symbols of only a downlink soft type and an uplink soft type are indicated as available. |
| 4 | A symbol of only a flexible soft type is indicated as available. |
| 5 | Symbols of only a downlink soft type and a flexible soft type are indicated as available. |
| 6 | Symbols of only an uplink soft type and a flexible soft type are indicated as available. |
| 7 | Symbols of an uplink soft type, a downlink soft type, and a flexible soft type are indicated as available. |

The DCI only indicates that a symbol whose resource type is a soft resource is available, and does not directly indicate that the symbol whose resource type is the soft resource is unavailable. The DU of the IAB node uses a symbol configured as a soft resource in response to an MT behavior after the DU of the IAB node using the symbol configured as the soft resource being the same as an MT behavior in response to the symbol being configured as an unavailable resource for the DU (that is, use of the symbol by the DU does not affect the MT behavior), or in response to the symbol being indicated as available by the dedicated DCI. Otherwise, the DU of the IAB node cannot use the symbol configured as the soft resource.

There is different resource multiplexing types between an MT resource and a DU resource in an IAB node, for example, time division multiplexing (time division multiplexing, TDM), space division multiplexing (space division multiplexing, SDM), dynamic SDM, and full-duplex multiplexing. For the different resource multiplexing types, there are different correspondences between a resource configuration of an MT resource and a resource configuration of a DU resource. For example, if the resource multiplexing type is the TDM, the MT and the DU of the IAB node cannot simultaneously perform transmission. If the resource multiplexing type is the SDM, the MT and the DU simultaneously perform receiving or sending. If the resource multiplexing type is the full duplex, the MT and the DU simultaneously perform transmission, where the simultaneous transmission is not limited to simultaneous receiving or simultaneous sending.

In the integrated access and backhaul system shown in FIG. 1, one IAB node is connected to one parent node. However, in a multi-hop integrated access and backhaul system, a parent backhaul link of an IAB node is not stable due to load imbalance, link blocking, and the like. To resolve the foregoing problem, a dual connectivity technology is introduced, that is, a redundant link is introduced, to improve robustness of the parent backhaul link of the IAB node and implement load balancing.

Figure 4:
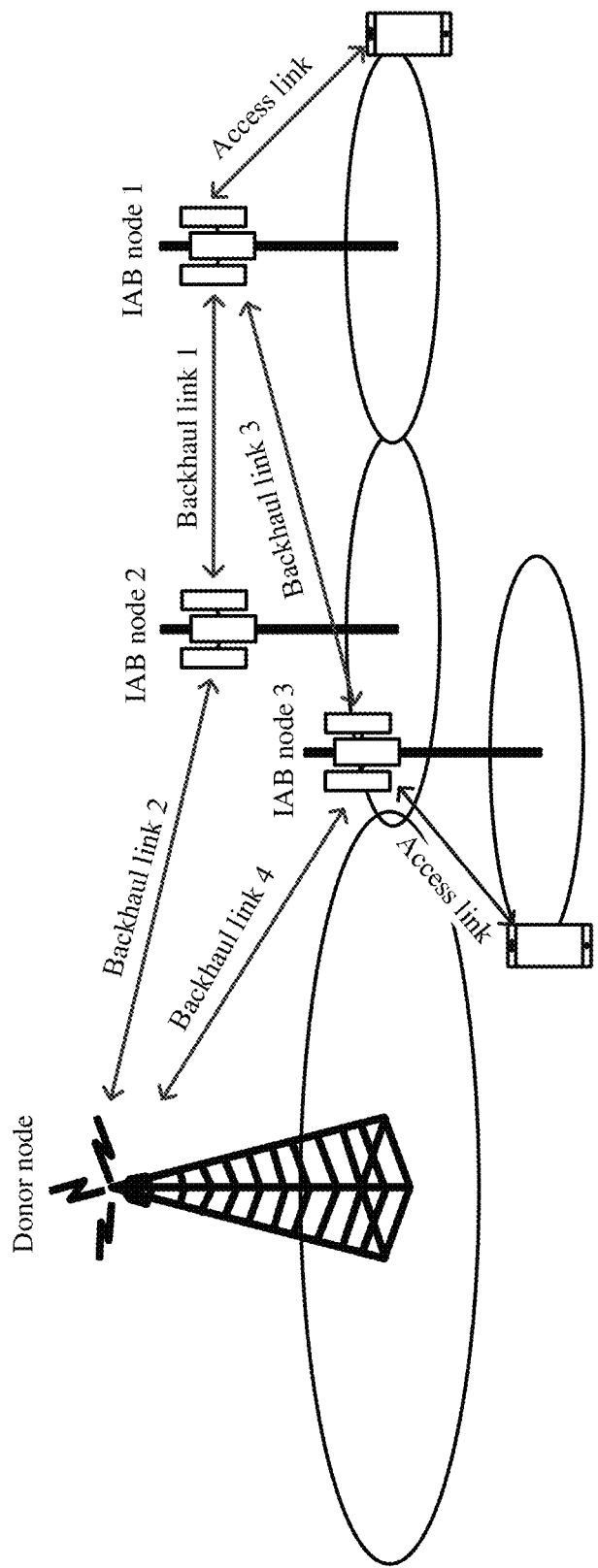
FIG. 4 is a schematic diagram of an example of a dual connectivity scenario.

FIG. 4 is a schematic diagram of an example of a dual connectivity scenario. As shown in FIG. 4, an IAB node 1 is connected to an IAB node 2 over a backhaul link 1, and access a network through the IAB node 2. Alternatively, the IAB node 1 is connected to an IAB node 3 over a backhaul link 3, and access a network through the IAB node 3. That is, both the IAB node 2 and the IAB node 3 are parent nodes of the IAB node 1. Names of the IAB nodes 1, 2, and 3 do not constitute any limitation on a scenario or a network in which the IAB nodes 1, 2, and 3 are deployed, and there is any other name such as a relay or an RN. In at least one embodiment, the IAB node is used only for ease of description.

In FIG. 4, the two parent nodes of the IAB node are both IAB nodes. In actual deployment, any parent node is an IAB node, or is a common base station. In response to the two parent nodes being IAB nodes, the two parent nodes have a same donor node, or have different donor nodes. A type of a parent node and network deployment are not specifically limited in at least one embodiment, provided that an IAB node has two parent nodes.

Figure 5:
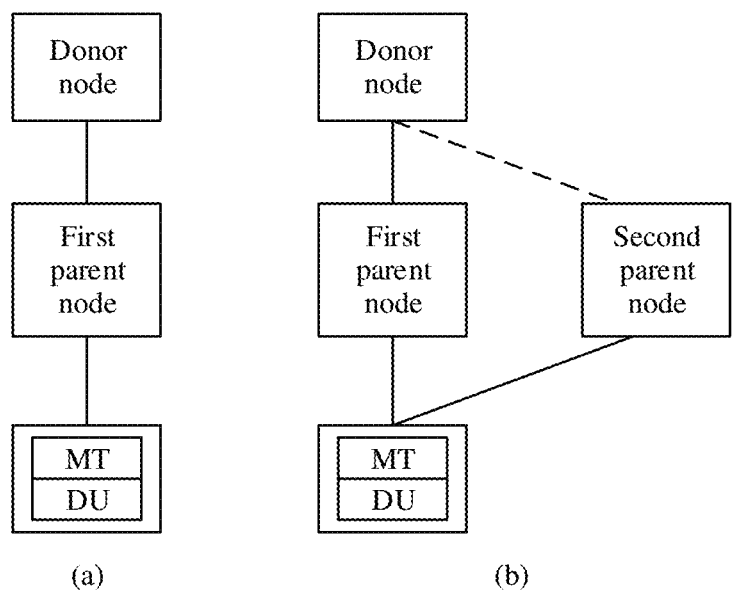
FIG. 5 is a diagram of comparison between single connection and dual connectivity.
Figure 6:
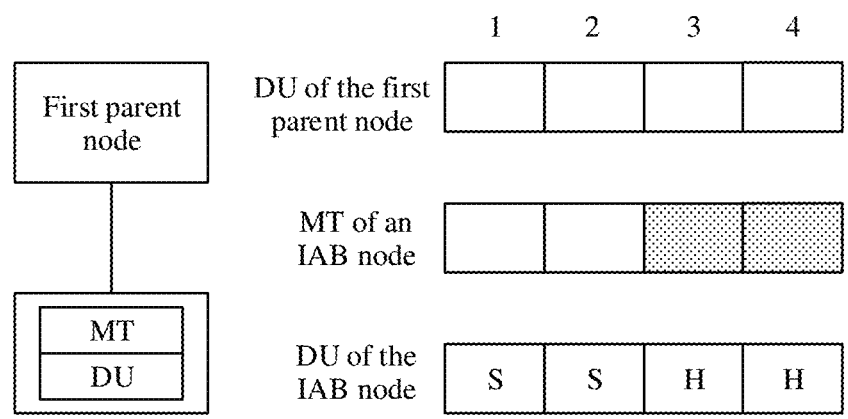
FIG. 6 shows an example of deducing a resource type of an MT in a single connection scenario.

In a single connection scenario, namely, a scenario in which an IAB node has only one parent node, and in a scenario shown in (a) in FIG. 5, a donor node provides a resource type of a DU of an IAB node for the IAB node and a parent node of the IAB node (in response to the parent node not being the donor node), and then the IAB node and the parent node of the IAB node determine a resource type of an MT of the IAB node based on the resource type that is of the DU of the IAB node and that is provided by the donor node, to perform communication over a backhaul link. FIG. 6 shows an example in which an IAB node determines a resource type of an MT of an IAB node based on a resource type of a DU of the IAB node in a single connection scenario. In FIG. 6, a slot is used as an example, and one block represents one slot. Four slots of the MT of the IAB node and four slots of the DU of the IAB node are considered. Because a hard resource is a resource that is always available for the DU of the IAB node, communication between a parent node and the MT of the IAB node needs to avoid the hard resource for the DU. In FIG. 6, a slot 3 and a slot 4 are configured as the hard resources of the DU. Therefore, the MT of the IAB node and the parent node perform backhaul link transmission in a slot 1 and a slot 2.

Figure 7:
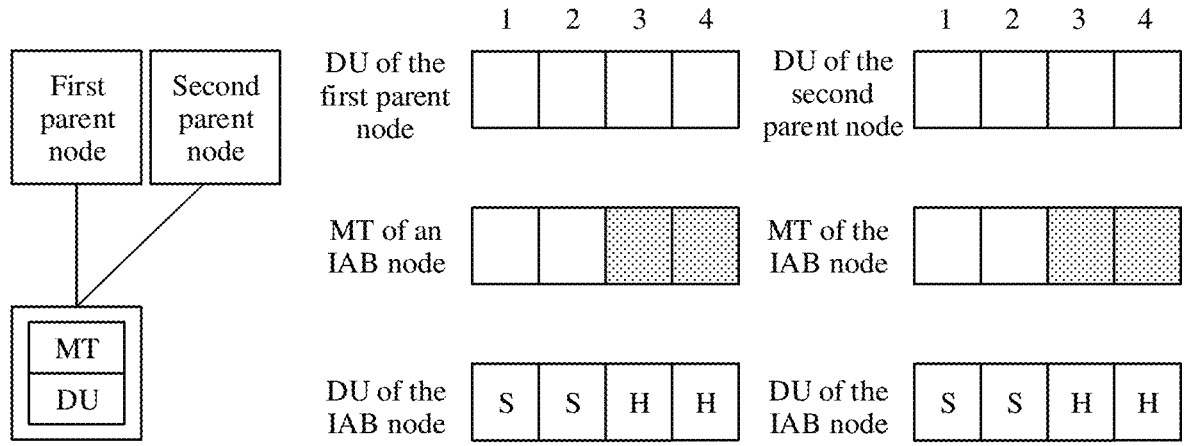
FIG. 7 shows an example of deducing a resource type of an MT in a dual connectivity scenario.

In response to the IAB node having only one parent node, the resource type of the MT of the IAB node is correctly deduced in the foregoing manner. However, in response to an IAB node having two parent nodes, for example, in a scenario shown in (b) in FIG. 5, if a parent node 1 and a parent node 2 each deduce an available MT resource by using a resource type of a DU of the IAB node, the two parent nodes deduce same available MT resources (as shown in FIG. 7), resulting in a resource conflict. Therefore, the solution in the single connection scenario is no longer applicable to the dual connectivity scenario.

To resolve the foregoing problem, at least one embodiment provides a resource configuration method and a communication apparatus, to implement resource configuration of an IAB node in the dual connectivity scenario.

Figure 8:
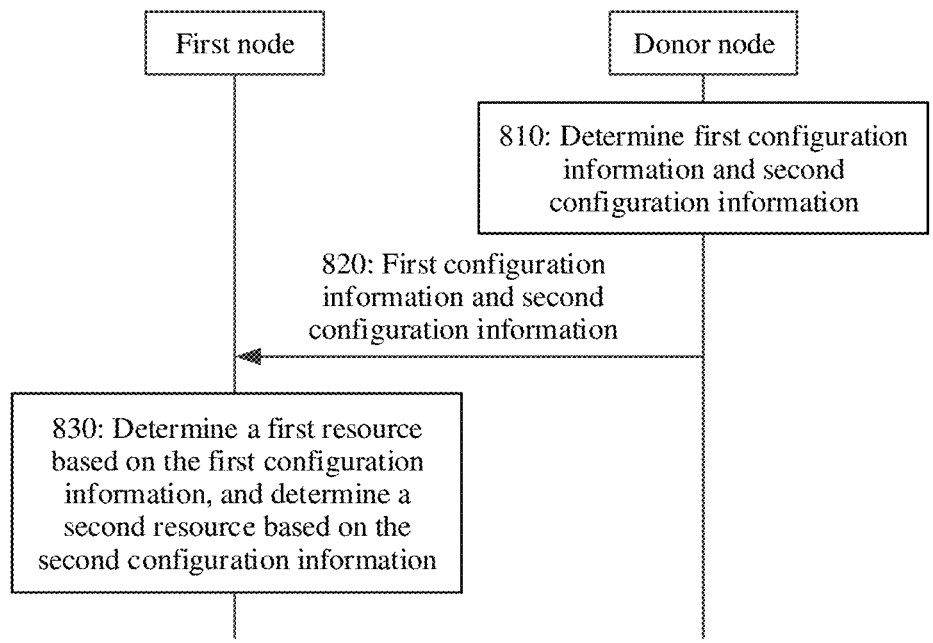
FIG. 8 is a schematic flowchart of a resource configuration method according to at least one embodiment according to at least one embodiment.

FIG. 8 is a schematic flowchart of a resource configuration method according to at least one embodiment. The method shown in FIG. 8 includes at least a part of the following content.

In step 810, a donor node determines first configuration information and second configuration information. The first configuration information corresponds to a first parent node of a first node, the second configuration information corresponds to a second parent node of the first node, the first configuration information indicates a resource type of a DU of the first node, and the second configuration information indicates the resource type of the DU of the first node.

The resource type is the foregoing hard resource, soft resource, or unavailable resource.

In step 820, the donor node sends the first configuration information and the second configuration information to the first node, and accordingly the first node receives the first configuration information and the second configuration information from the donor node.

The first node is a relay node, for example, an IAB node.

In step 820, the first node determines a first resource based on the first configuration information, and determines a second resource based on the second configuration information. The first resource is a resource for communication between an MT of the first node and the first parent node, and the second resource is a resource for communication between the MT of the first node and the second parent node.

In other words, in response to the IAB node deducing an available MT resource, different resource sets are used in response to the IAB node communicating with different parent nodes. Specifically, in response to communicating with the first parent node, the IAB node deduces an available MT resource and an MT behavior based on the first configuration information; in response to communicating with the second parent node, the IAB node deduces an available MT resource and an MT behavior based on the second configuration information.

In at least one embodiment, the first configuration information indicates that a resource type of the DU of the first node in first time domain is a first type, the second configuration information indicates that the resource type of the DU of the first node on a first time domain resource is a second type, and the first type is different from the second type. In other words, the first configuration information is different from the second configuration information. In this way, the first resource determined by the IAB node based on the first configuration information is different from the second resource determined by the IAB node based on the second configuration information. For the parent nodes of the IAB node, the donor node sends the first configuration information to the first parent node, and send the second configuration information to the second parent node. The first parent node determines the first resource based on the first configuration information, and use the first resource to communicate with the MT of the IAB node. The second parent node determines the second resource based on the second configuration information, and use the second resource to communicate with the MT of the IAB node. In this way, the resource conflict mentioned above is avoided.

The first resource and the second resource are different. In other words, the first resource and the second resource do not overlap. For example, the first resource and the second resource are time division multiplexed in time domain or meet a time domain orthogonalization condition.

In the technical solution of at least one embodiment, in response to the first node having two parent nodes: the first parent node and the second parent node, the donor node provides two pieces of configuration information for the first node, and each piece of configuration information corresponds to one parent node. The first node determines, based on the configuration information corresponding to the first parent node, a resource for communication between the MT and the first parent node of the first node; and determine, based on the configuration information corresponding to the second parent node, a resource for communication between the MT and the second parent node of the first node. In this way, the resource conflict mentioned above is avoided if the first configuration information and the second configuration information are properly configured.

Figure 9:
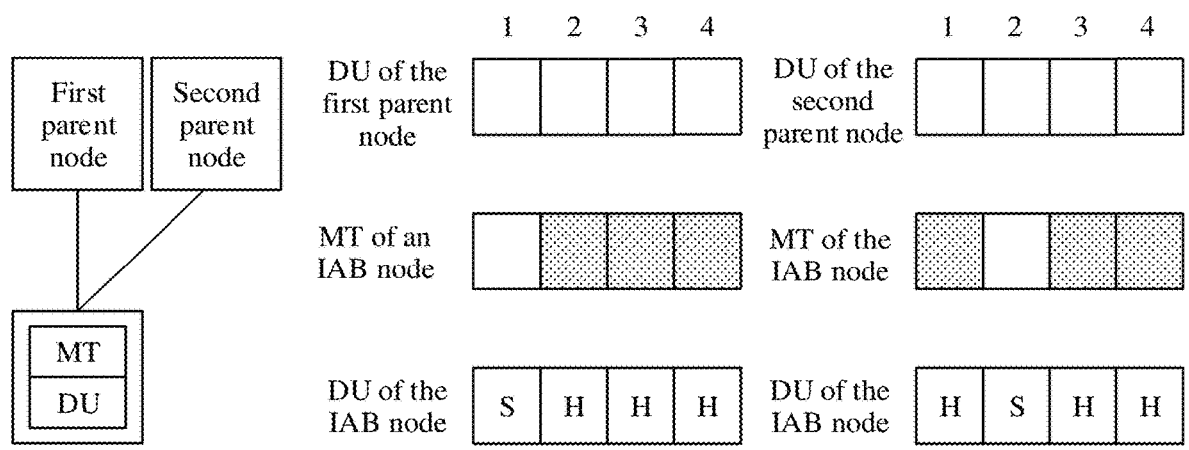
FIG. 9 shows an example of applying a resource configuration method according to at least one embodiment according to at least one embodiment.

FIG. 9 shows an example of applying a resource configuration method according to at least one embodiment. In FIG. 9, for example, a first node is an IAB node, a time domain resource is a slot, and one block represents one slot. Four slots of an MT of the IAB node and four slots of a DU of the IAB node are considered. As shown in FIG. 9, for a first parent node, first configuration information indicates that resource types of the DU of the IAB node in slots 1 to 4 are a soft resource (Soft, S), a hard resource (Hard, H), a hard resource (Hard, H), and a hard resource (Hard, H) respectively. Therefore, the first parent node considers that the first parent node communicates with the MT of the IAB node in the slot 1. For a second parent node, second configuration information indicates that the resource types of the DU of the IAB node in slots 1 to 4 are a hard resource, a soft resource, a hard resource, and a hard resource respectively. Therefore, the second parent node considers that the second parent node communicates with the MT of the IAB node in the slot 2. In this way, resources for communication between the first parent node and the IAB node and communication between the second parent node and the IAB node are orthogonalized, in other words, there is no conflict.

In some embodiments, the first parent node and the second parent node may separately send, to the IAB node, dynamic resource indication DCI, for example, DU resource availability indication DCI, namely, DCI format 2_5 in an existing protocol. In response to the IAB node having two DU resource types respectively corresponding to different parent nodes, a dynamic resource indication sent by any parent node needs to be based on a DU resource type corresponding to the parent node. For example, the dynamic resource indication sent by the first parent node indicates only availability of a soft resource in the DU resource types, or the IAB node considers that availability of a soft resource in the DU resource types indicated by the first configuration information is indicated by the DCI sent by the first parent node, or the IAB node considers that the dynamic resource indication DCI sent by the first parent node indicates only availability of a soft resource indicated by the first configuration information. The dynamic resource indication sent by the second parent node indicates only availability of a soft resource in the DU resource types, or the IAB node considers that availability of a soft resource in the DU resource types indicated by the second configuration information is indicated by the DCI sent by the second parent node, or the IAB node considers that the dynamic resource indication DCI sent by the second parent node indicates only availability of a soft resource indicated by the second configuration information. For example, for a soft resource indicated by a first resource configuration, if a dynamic resource indication sent by the first parent node does not indicate availability of the soft resource, the IAB node use the soft resource for the DU only in response to a communication behavior between the MT and the first parent node of the IAB node not being affected. For a soft resource indicated by a second resource configuration, if a dynamic resource indication sent by the second parent node does not indicate availability of the soft resource, the IAB node uses the soft resource for the DU only in response to a communication behavior between the MT and the second parent node of the IAB node not being affected.

In at least one embodiment, both the first configuration information and the second configuration information indicate that a resource for the DU is a soft resource. In this case, only in response to both the first parent node and the second parent node indicating that the time domain resource is an available resource, the first node considers that the time domain resource is an available resource for the DU. However, in response to any one of the parent nodes not indicating availability of the time domain resource, the IAB node uses the soft resource of the DU only in response to a communication behavior between the MT of the IAB node and the parent node not being affected.

In the foregoing solution, because the IAB node receives two pieces of configuration information of the DU of the IAB node: the first configuration information and the second configuration information, the IAB node needs to determine an actual resource type of the DU based on both the first configuration information and the second configuration information.

In response to the first configuration information indicating that a resource type of the DU on a second time domain resource is a hard resource, and similarly, in response to the second configuration information indicating that the resource type of the DU on the second time domain resource is a hard resource, that is, in response to the second time domain resource being the hard resource for both the first parent node and the second parent node, the IAB node determines that both the first parent node and the second parent node consider that the second time domain resource is an available resource for the IAB node, that is, the second time domain resource is actually a hard resource for the DU.

In response to the first configuration information indicating that a resource type of the DU on a third time domain resource is a hard resource, and the second configuration information indicates that the resource type of the DU on the third time domain resource is a soft resource, that is, in response to the third time domain resource being the hard resource for the first parent node and is the soft resource for the second parent node, the IAB node determines that the first parent node does not indicate availability of the third time domain resource, but the second parent node indicates availability of the third time domain resource by using DCI. In this case, the availability of the third time domain resource is indicated by the DCI sent by the second parent node. In response to the DCI indicating that the third time domain resource is available, the DU of the IAB node uses the third time domain resource. However, in response to the DCI not indicating the availability of the third time domain resource, the IAB node considers that the second parent node communicates with the IAB node on an MT resource corresponding to the third time domain resource. If the DU of the IAB node needs to use the third time domain resource, a communication behavior between the MT and the second parent node cannot be affected. Therefore, in response to determining the availability of the third time domain resource, the DU of the IAB node needs to refer to the indication of the second parent node, that is, the third time domain resource is actually a soft resource for the DU. Similarly, in response to the first configuration information indicating that the resource type of the DU on the third time domain resource is a soft resource, and the second configuration information indicates that the resource type of the DU on the third time domain resource is a hard resource, the third time domain resource is actually the soft resource for the DU. Alternatively, in response to the first configuration information indicating that a resource type of the DU on a third time domain resource is a soft resource, and the second configuration information indicates that the resource type of the DU on the third time domain resource is a soft resource, that is, in response to the third time domain resource being the soft resource for both the first parent node and the second parent node, the IAB node determines that both the first parent node and the second parent node indicates availability of the third time domain resource by using DCI. In this case, the IAB node considers that both the first parent node and the second parent node communicates with the IAB node on an MT resource corresponding to the third time domain resource. Therefore, in response to determining the availability of the third time domain resource, the DU of the IAB node needs to refer to the indication of the first parent node and the indication of the second parent node, that is, the third time domain resource is actually a soft resource for the DU.

In response to the first configuration information indicating that a resource type of the DU on a fourth time domain resource is an unavailable resource, and the second configuration information indicates that the resource type of the DU on the fourth time domain resource is a hard resource, a soft resource, or an unavailable resource, that is, in response to the fourth time domain resource being the unavailable resource for the first parent node, and is the hard resource, the soft resource, or the unavailable resource for the second parent node, the IAB node determines that the DU cannot use the fourth time domain resource, that is, the fourth time domain resource is actually an unavailable resource for the DU. Similarly, in response to the first configuration information indicates that the resource type of the DU on the fourth time domain resource is a hard resource, a soft resource, or an unavailable resource, and the second configuration information indicates that the resource type of the DU on the fourth time domain resource is an unavailable resource, the fourth time domain resource is actually the unavailable resource for the DU. In at least one embodiment, unavailable resources indicated by the first resource configuration and the second resource configuration are the same. To be specific, the IAB node does not expect that a resource is indicated as unavailable by the first resource configuration, but is indicated as a hard resource or a soft resource by the second resource configuration, and vice versa.

Table 2 shows actual resource types obtained by combining resource types.

TABLE 2

| Second configuration information | First configuration information | | |
| --- | --- | --- | --- |
| | Hard resource | Soft resource | Unavailable resource |
| Hard resource | Hard resource | Soft resource | Unavailable resource |
| Soft resource | Soft resource | Soft resource | Unavailable resource |
| Unavailable resource | Unavailable resource | Unavailable resource | Unavailable resource |

In at least one embodiment, an actual resource type obtained by combining the resource types is defined in a protocol. For example, a protocol defines only an actual resource type obtained by combining a hard resource and another resource type, and may not define an actual resource type obtained by combining other resources types. For another example, a protocol defines the actual resource types obtained by combining the resource types shown in Table 2.

In another possible implementation, a protocol alternatively reserves combining of resource types for the DU of the IAB node for implementation, that is, the protocol does not explicitly define an actual resource type obtained by combining the foregoing resource types.

From the foregoing descriptions that in a dual connectivity scenario, there are three types of resource configurations of the DU:
1. A first resource configuration indicated by the first configuration information;
2. A second resource configuration indicated by the second configuration information; and
3. A third resource configuration determined based on the first configuration information and the second configuration information.

Figure 10:
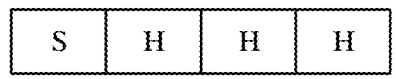
FIG. 10 is a schematic diagram of three types of resource configurations according to at least one embodiment.
Figure 10:
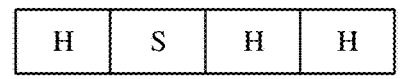
Figure 10:
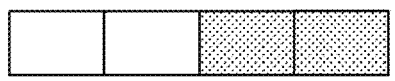
Figure 10:
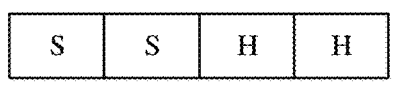

As shown in FIG. 10, the foregoing embodiments are described by using an example in which the first resource configuration is a resource configuration corresponding to the first parent node, the second resource configuration is a resource configuration corresponding to the second parent node, and a third resource configuration is the actual resource configuration of the DU.

The IAB node determines, based on the first resource configuration, a resource for communication with the first parent node; determines, based on the second resource configuration, a resource for communication with the second parent node; and determines, based on the third resource configuration, a resource for communication between the DU of the IAB node and a child node or UE. Accordingly, the first parent node and the second parent node need to determine, based on the first resource configuration and the second resource configuration, a resource for communication between the first parent node and the IAB node and a resource for communication between the second parent node and the IAB node. To achieve this objective, a donor node sends first resource configuration information and second resource configuration information to the first parent node and the second parent node, that is, send configurations of a DU of a child node to the first parent node and the second parent node, where the child node herein is an IAB node.

In at least one embodiment, the donor node sends the first resource configuration of the DU of the IAB node to the first parent node, and sends the second resource configuration of the DU of the IAB node to the second parent node. The first parent node communicates with the IAB node based on the first resource configuration, and the second parent node communicates with the IAB node based on the second resource configuration. In this case, a manner of determining a resource in response to a parent node communicating with the IAB node being the same as that in the single connection scenario.

In at least one embodiment, the donor node sends the first resource configuration and the second resource configuration that are of the DU of the IAB node to the first parent node and the second parent node. The first parent node communicates with the IAB node based on the first resource configuration, and the second parent node communicates with the IAB node based on the second resource configuration. Similarly, a manner of determining a resource in response to a parent node communicates with the IAB node being the same as that in a single connection scenario.

In some other possible implementations, the first resource configuration is an actual resource configuration of the DU, the second resource configuration is a resource configuration corresponding to the first parent node or the second parent node, and the third resource configuration is a resource configuration corresponding to the second parent node or the first parent node; or the first resource configuration is a resource configuration corresponding to the first parent node or the second parent node, the second resource configuration is an actual resource configuration of the DU, and the third resource configuration is a resource configuration corresponding to the second parent node or the first parent node.

For example, the first resource configuration is the actual resource configuration of the DU, the second resource configuration is the resource configuration corresponding to the second parent node, and the third resource configuration is the resource configuration corresponding to the first parent node. The IAB node separately obtains the first configuration information and the second configuration information, to deduce the third resource configuration, namely, the resource configuration corresponding to the first parent node. The first parent node obtains the first configuration information. The second parent node separately obtains the first configuration information and the second configuration information, to deduce the third resource configuration, namely, the resource configuration corresponding to the first parent node. The first parent node obtains the second resource configuration and the third resource configuration, and the second parent node obtains the second resource configuration.

Figure 11:
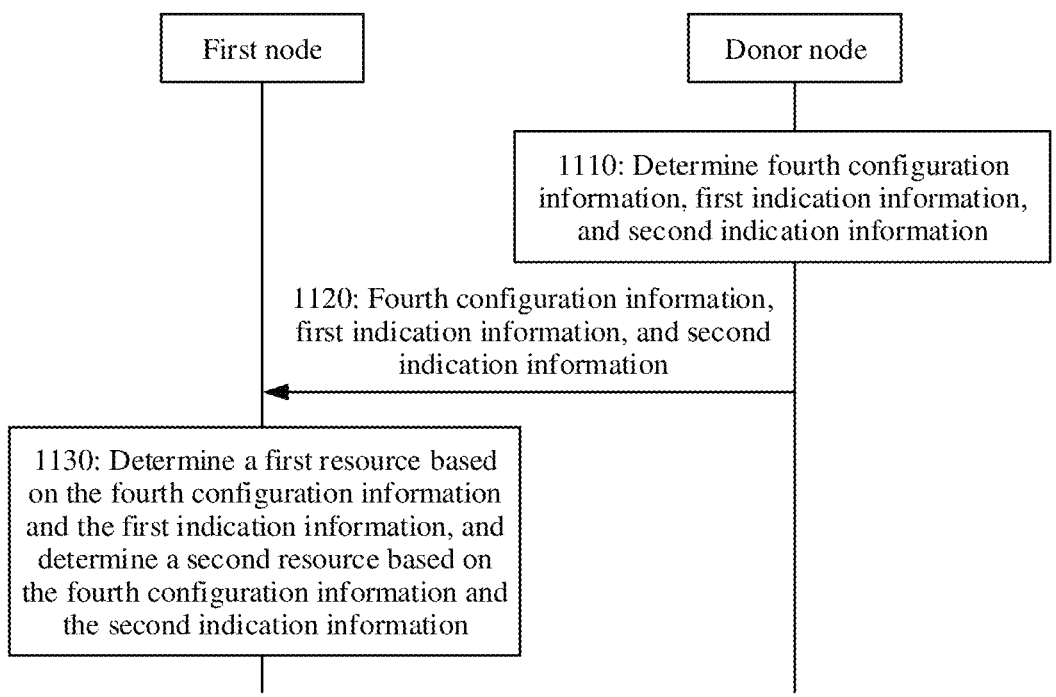
FIG. 11 is a schematic flowchart of another resource configuration method according to at least one embodiment.

FIG. 11 is a schematic flowchart of another resource configuration method according to at least one embodiment. The method shown in FIG. 11 includes at least a part of the following content.

In step 1110, a donor node determines fourth configuration information, first indication information, and second indication information. The fourth configuration information indicates a resource type of a DU of a first node, the first indication information indicates a time domain position of an unavailable resource for a DU of a first parent node of the first node, and the second indication information indicates a time domain position of an unavailable resource for a DU of a second parent node of the first node.

The first indication information indicates a link-level unavailable resource configured for the first parent node.

The second indication information indicates a link-level unavailable resource configured for the second parent node.

A link-level unavailable resource means that the unavailable resource is applicable only to a specific link. For example, the first indication information indicates an unavailable resource for a link between the first parent node and the first node, and the second indication information indicates an unavailable resource for a link between the second parent node and an IAB node. A resource is an unavailable resource for a specific link, but is an available resource for another link.

The donor node sends the resource type of the DU of the first node and the first indication information to the first parent node. The donor node sends the resource type of the DU of the first node and the second indication information to the second parent node.

Optionally, the donor node sends the first indication information and the second indication information to the first node through an F1-AP interface. In response to a link-level NA configuration of a parent node being a DU cell configuration associated with a parent node, the IAB node does not learn of a correspondence between a DU cell of a parent node and an MT component carrier, an MT serving cell (MT serving cell), or a DU cell of a first node. Therefore, the parent node or the donor node further needs to notify the first node of the correspondence between a DU cell of a parent node and an MT component carrier of a first node, the correspondence between a DU cell of a parent node and an MT serving cell of an IAB node, or the correspondence between a DU cell of a parent node and a DU cell of an IAB node.

Optionally, the donor node alternatively sends interface signaling or air interface signaling to the first node through the parent node.

In step 1120, the donor node sends the fourth configuration information, the first indication information, and the second indication information to the first node, and accordingly the first node receives the fourth configuration information, the first indication information, and the second indication information from the donor node.

In step 1130, the first node determines a third resource based on the fourth configuration information and the first indication information, and determines a fourth resource based on the fourth configuration information and the second indication information. The third resource is a resource for communication between the MT of the first node and the first parent node, and the fourth resource is a resource for communication between the MT of the first node and the second parent node.

Optionally, the time domain position of the unavailable resource indicated by the first indication information is different from the time domain position of the unavailable resource indicated by the second indication information.

The donor node sends the fourth configuration information and the first indication information to the first parent node, so that the first parent node determines the resource for communication with the MT of the first node. The donor node sends the fourth configuration information and the second indication information to the second parent node, so that the second parent node determines the resource for communication with the MT of the first node.

In other words, in at least one embodiment, the donor node configures a link-level unavailable resource for a parent node. After receiving the fourth configuration information, the first indication information, and the second indication information, the first node respectively determines resources used in response to the MT communicating with different parent nodes. After receiving the fourth configuration information and the first indication information, the first parent node determines a resource used in response to the first parent node communicating with the first node. After receiving the fourth configuration information and the second indication information, the second parent node determines a resource used in response to the second parent node communicating with the first node.

Figure 12:
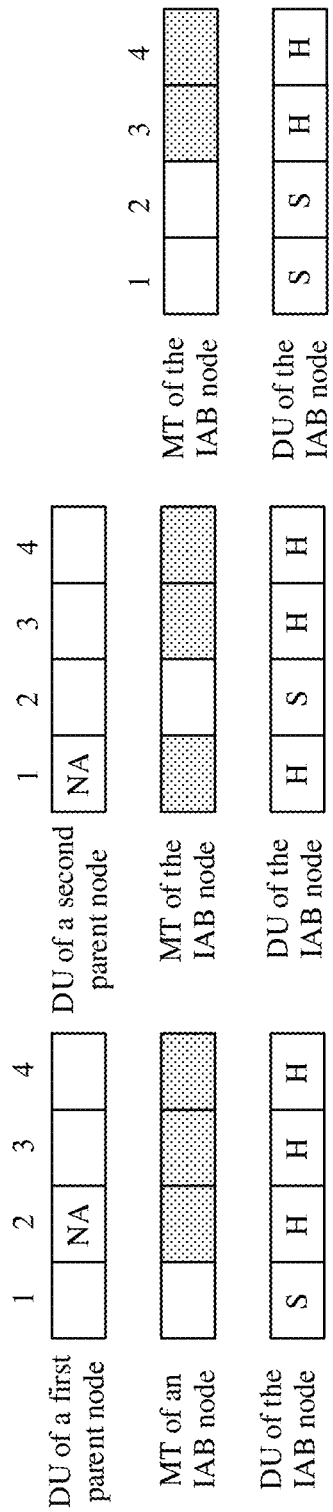
FIG. 12 shows an example of applying a resource configuration method according to at least one embodiment.

FIG. 12 shows an example of applying a resource configuration method according to at least one embodiment. In FIG. 12, for example, a first node is an IAB node, a time domain resource is a slot, and one block represents one slot. Four slots of an MT of the IAB node and four slots of a DU of the IAB node are considered. As shown in FIG. 12, fourth configuration information indicates that resource types of the DU of the IAB node in slots 1 to 4 are a soft resource, a soft resource, a hard resource, and a hard resource respectively. For a first parent node, first indication information indicates that a DU of the first parent node is an unavailable resource in the slot 2. For a second parent node, second indication information indicates that a DU of the second parent node is an unavailable resource in the slot 1. The IAB node, the first parent node, and the second parent node determine some unavailable resources of the MT of the IAB node (for example, the slots 3 and 4 in FIG. 12) based on the fourth configuration information, and further additionally determine some unavailable resources of the MT of the IAB node based on the first indication information and/or the second indication information. For example, the IAB node additionally determines that the IAB node does not communicate with the first parent node in the slot 2, and does not communicate with the second parent node in the slot 1.

In FIG. 11, the first node receives the first indication information and the second indication information from the donor node, to further determine the resources respectively used in response to the first node communicating with the different parent nodes. The first node further determines, by receiving a first dynamic resource indication from the first parent node and a second dynamic resource indication from the second parent node in addition to using the manner shown in FIG. 11, resources respectively used in response to the first node communicating with different parent nodes. The first dynamic resource indication is determined by the first parent node based on the first indication information, and the second dynamic resource indication is determined by the second parent node based on the second indication information. The IAB node learns that a parent node does not communicate with the IAB node on a resource that is indicated as available for the DU.

The first dynamic resource indication and the second dynamic resource indication are indicated by using dedicated DCI, for example, DCI format 2_5.

Figure 13:
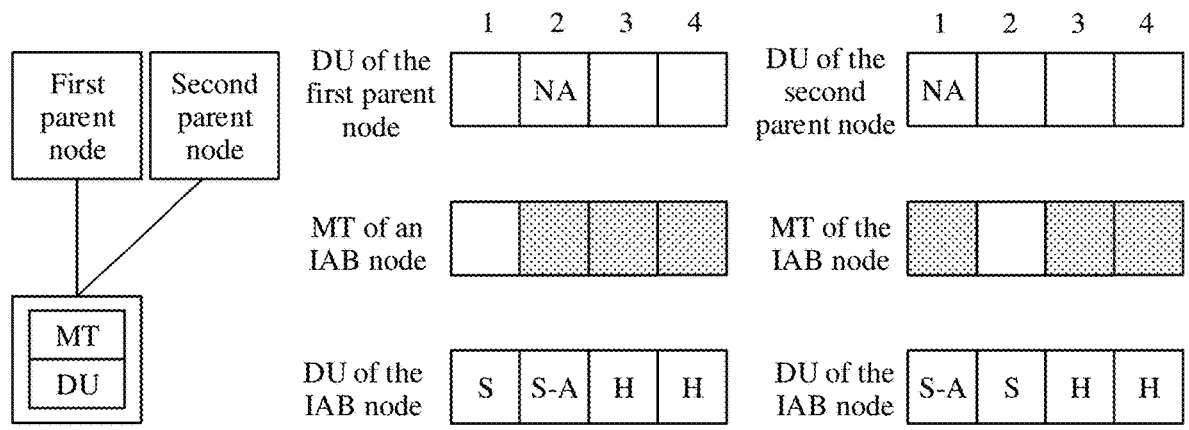
FIG. 13 shows an example in which an IAB node further determines a communication resource based on a dynamic resource indication.

FIG. 13 shows an example in which an IAB node further determines a communication resource based on a dynamic resource indication. In FIG. 13, for example, a first node is the IAB node, a time domain resource is a slot, and one block represents one slot. Four slots of an MT of the IAB node and four slots of a DU of the IAB node are considered.

A first parent node is an unavailable resource for the IAB node in a slot 2. Therefore, the first parent node indicates, in a first dynamic resource indication, the slot 2 as an available resource for the DU of the IAB node. In this case, the IAB node deduces that the first parent node does not communicate with the IAB node on an MT resource corresponding to the available resource. A second parent node is an unavailable resource for the IAB node in a slot 1. Therefore, the second parent node indicates, in a second dynamic resource indication, the slot 1 as an available resource for the DU of the IAB node. In this case, the IAB node deduces that the second parent node does not communicate with the IAB node on an MT resource corresponding to the available resource. In this way, resources of a plurality of parent nodes are partitioned.

Similarly, in this embodiment, an actual available resource for the DU of the first node needs to be determined by using both the dynamic resource indication of the first parent node and the dynamic resource indication of the second parent node. Specifically, only in response to both the first parent node and the second parent node indicating that a fifth time domain resource is an available resource, the first node considers that the fifth time domain resource is the available resource for the DU. However, in response to any one of the parent nodes not indicating availability of the fifth time domain resource, the IAB node uses the soft resource of the DU only in response to a communication behavior between the MT of the IAB node and the parent node not being affected.

In at least one embodiment, if the donor node sends first indication information and second indication information to the first node, and a DU resource of the first parent node or the second parent node is a link-level unavailable resource, the IAB node ignores a dynamic resource indication of the parent node on a corresponding DU resource of the IAB node.

Figure 14:
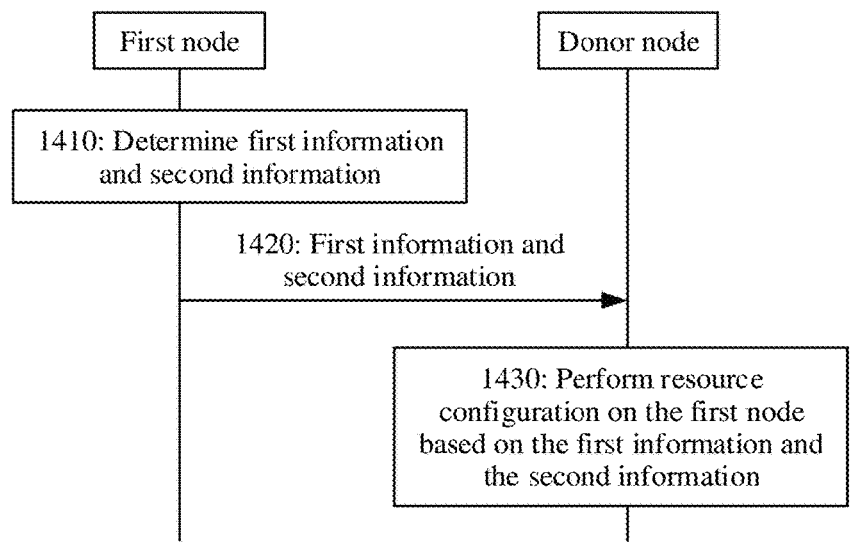
FIG. 14 is a schematic flowchart of still another resource configuration method according to at least one embodiment.

FIG. 14 is a schematic flowchart of still another resource configuration method according to at least one embodiment. The method shown in FIG. 14 includes at least a part of the following content.

In step 1410, a first node determines first information and second information. The first information corresponds to a first parent node, the second information corresponds to a second parent node, the first information indicates a multiplexing capability between a carrier that is of an MT of the first node and that is associated with the first parent node, and a cell of a DU of the first node. The second information indicates a multiplexing capability between a carrier that is of the MT of the first node and that is associated with the second parent node, and the cell of the DU of the first node. In the first information, the carrier of the MT is a carrier used or configured in response to the MT communicating with the first parent node. In the second information, the carrier of the MT is a carrier used or configured in response to the MT communicating with the second parent node.

Because different parent nodes use different antenna panels (with different orientations) in response to communicating with the MT of the first node, for different parent nodes, there are different multiplexing capabilities between carriers of the MT of the first node and the cell of the DU of the first node. Based on this, in step 1410, for different parent nodes, the first node respectively determines a multiplexing capability between a carrier of the MT of the first node and a cell of the DU of the first node.

Optionally, the multiplexing capability is any one of a first capability, a second capability, a third capability, a fourth capability, and a fifth capability. The first capability indicates that signal sending of the MT and signal sending of the DU are simultaneously implemented. The second capability indicates that signal sending of the MT and signal receiving of the DU are simultaneously implemented. The third capability indicates that signal receiving of the MT and signal sending of the DU are simultaneously implemented. The fourth capability indicates that signal receiving of the MT and signal receiving of the DU is simultaneously implemented. The fifth capability indicates that signal receiving or sending of the MT and signal receiving or sending of the DU cannot be simultaneously implemented.

In step 1420, the first node sends the first information and the second information to a donor node, and accordingly the donor node receives the first information and the second information from the first node. That is, for the different parent nodes, the first node reports the multiplexing capability between the carrier of the MT and the cell of the DU to the donor node.

In some embodiments, the first node directly reports the first information and the second information to the donor node by using interface signaling. In this case, the first information and the second information reported by the first node need to enable the donor node to distinguish between the parent node corresponding to the first information and the parent node corresponding to the second information.

Optionally, the first node sends the first information and the second information by using different signaling, to indicate or distinguish between different parent nodes.

Optionally, the first node may carry identifiers of corresponding parent nodes in signaling for reporting the first information and/or the second information, to indicate or distinguish between different parent nodes.

Optionally, the first node carries identifiers of corresponding parent nodes in the first information and/or the second information, to indicate or distinguish between different parent nodes.

For the first node, dual connectivity is implemented in the following two manners.

Manner 1: A single MT of the first node is connected to different parent nodes. A cell group in which the MT communicates with the first parent node (primary connection node) is referred to as a master cell group (master cell group, MCG), and a cell group in which the MT communicates with the second parent node (secondary connection node) is referred to as a secondary cell group (secondary cell group, SCG). A cell group represents a plurality of cells, serving cells (serving cells), or component carriers used by the MT for carrier aggregation. In this case, the donor node, the parent node, or the first node indicates or distinguish between the parent nodes by using the cell groups.

Manner 2: The first node alternatively implements dual connectivity by using a plurality of MT modules. Different MT modules communicate with different parent nodes to form different cell groups. In addition, because the plurality of MTs are independent modules, cell groups of different MT modules are not categorized as the MCG or the SCG. In this case, the donor node, the parent node, or the first node indicates or distinguish between parent nodes by using the cell groups, or indicates or distinguish between parent nodes by using identifiers of the MTs, where the identifier of the MT includes a radio network temporary identifier (radio network temporary identity, RNTI), an MT ID, or the like.

In conclusion, in at least one embodiment, different signaling, identifiers of parent nodes, cell IDs of the parent nodes, physical cell IDs of the parent nodes, master cell groups/secondary cell groups, PCell identifiers/sPCell identifiers, and the like are used to indicate or distinguish between the parent nodes.

In some embodiments, the first node further reports the first information to the first parent node, and reports the second information to the second parent node.

Optionally, the first node sends, by using interface signaling or air interface signaling, the first information to the first parent node and the second information to the second parent node.

Optionally, the first node alternatively first sends the first information and the second information to the donor node, and then the donor node sends the first information and the second information to the corresponding parent nodes.

The first node has a capability of simultaneously performing receiving and sending with a plurality of parent nodes. In some embodiments, to ensure that communication between the first node and the different parent nodes through the different antenna panels does not affect each other, the first node further reports third information to the donor node or the two parent nodes. The third information indicates multiplexing types of a first link and a second link. The first link is a communication link between the MT of the first node and the first parent node. The second link is a communication link between the MT of the first node and the second parent node.

Optionally, the third information indicates whether time domain and/or frequency domain orthogonalization or isolation is used for the first link and the second link.

Optionally, the third information is a multiplexing type between MT cells connected to different parent nodes.

Optionally, the third information indicates whether the first node supports simultaneous in-band DC transmission. Herein, in-band DC indicates that the MT of the IAB node uses component carriers (or serving cells) of a same frequency band to communicate with different parent nodes.

Optionally, the multiplexing types of the first link and the second link are represented as a multiplexing type of an MCG of the MT and a multiplexing type of an SCG of the MT.

Optionally, the multiplexing type is time division multiplexing TDM, space division multiplexing SDM, dynamic SDM, full-duplex multiplexing, or the like.

In response to the first node being connected to different parent nodes, quantities of guard symbols used for switching between the MT and the DU of the first node are different. Therefore, in some embodiments, for the different parent nodes, the first node further respectively determines and report guard symbol information corresponding to the parent nodes.

In the foregoing embodiments, only an example in which the first node has two parent nodes is used. Embodiments described herein are also applied to a scenario in which the first node has more parent nodes. The foregoing embodiments are separately implemented, or are properly combined for implementation.

To implement the functions in the foregoing embodiments, the communication apparatus includes a corresponding hardware structure and/or software module for performing each function. A person of ordinary skill in the art is aware that, in combination with the units and the method steps in the examples described in embodiments disclosed herein, at least one embodiment is implemented by hardware or a combination of hardware and computer software. Whether a function is performed by hardware or hardware driven by computer software depends on particular application scenarios and design constraints of the technical solutions.

Figure 15:
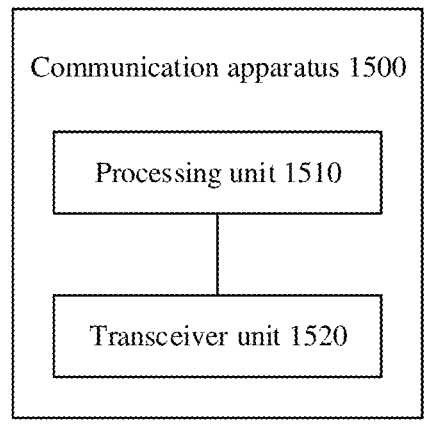
FIG. 15 is a schematic diagram of a structure of a communication apparatus according to at least one embodiment.
Figure 16:
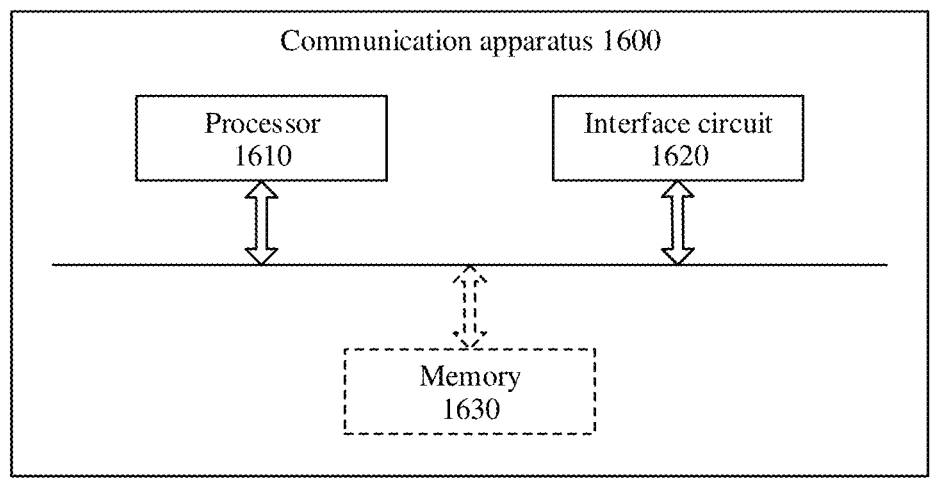
FIG. 16 is a schematic diagram of a structure of a communication apparatus according to at least one embodiment.

FIG. 15 and FIG. 16 are schematic diagrams of structures of communication apparatuses according to at least one embodiment.

These apparatuses are configured to implement functions of the first node, the first parent node, the second parent node, or the donor node in the foregoing method embodiments, and therefore also implement beneficial effects of the foregoing method embodiments. In at least one embodiment, the communication apparatus is the IAB node, the base station, or the terminal device shown in FIG. 1, or is a module (for example, a chip) used in the IAB node, the base station, or the terminal device.

As shown in FIG. 15, the communication apparatus 1500 includes a processing unit 1510 and a transceiver unit 1520. The apparatus 1500 is configured to implement a function of the first node, the first parent node, or the donor node in any method embodiment shown in FIG. 8, FIG. 11, or FIG. 14.

In response to the communication apparatus 1500 being configured to implement the function of the first node in the method embodiment shown in FIG. 8, the transceiver unit 1520 is configured to receive first configuration information and second configuration information from a donor node, where the first configuration information corresponds to a first parent node of the first node, the second configuration information corresponds to a second parent node of the first node, the first configuration information indicates a resource type of a distributed unit DU of the first node, the second configuration information indicates the resource type of the DU of the first node, and the resource type is a hard resource, a soft resource, or an unavailable resource; and the processing unit 1510 is configured to determine a first resource based on the first configuration information, where the first resource is a resource for communication between a mobile termination MT of the first node and the first parent node, and determine a second resource based on the second configuration information, where the second resource is a resource for communication between the MT of the first node and the second parent node.

In response to the communication apparatus 1500 being configured to implement the function of the donor node in the method embodiment shown in FIG. 8, the processing unit 1510 is configured to determine first configuration information and second configuration information, where the first configuration information corresponds to a first parent node of a first node, the second configuration information corresponds to a second parent node of the first node, the first configuration information indicates a resource type of a distributed unit DU of the first node, the second configuration information indicates the resource type of the DU of the first node, and the resource type is a hard resource, a soft resource, or an unavailable resource; and the transceiver unit 1520 is configured to send the first configuration information and the second configuration information.

In response to the communication apparatus 1500 being configured to implement the function of the first node in the method embodiment shown in FIG. 11, the transceiver unit 1520 is configured to receive fourth configuration information, first indication information, and second indication information, where the fourth configuration information indicates a resource type of a distributed unit DU of the first node, the first indication information indicates a time domain position of an unavailable resource for a DU of a first parent node of the first node, and the second indication information indicates a time domain position of an unavailable resource for a DU of a second parent node of the first node; and the processing unit 1510 is configured to determine a third resource based on the fourth configuration information and the first indication information, where the third resource is a resource for communication between a mobile termination MT of the first node and the first parent node, and determine a fourth resource based on the fourth configuration information and the second indication information, where the fourth resource is a resource for communication between the MT of the first node and the second parent node.

In response to the communication apparatus 1500 being configured to implement the function of the donor node in the method embodiment shown in FIG. 11, the processing unit 1510 is configured to determine fourth configuration information, first indication information, and second indication information, where the fourth configuration information indicates a resource type of a distributed unit DU of a first node, the first indication information indicates a time domain position of an unavailable resource for a DU of a first parent node of the first node, and the second indication information indicates a time domain position of an unavailable resource for a DU of a second parent node of the first node; and the transceiver unit 1520 is configured to send the fourth configuration information, the first indication information, and the second indication information.

In response to the communication apparatus 1500 being configured to implement the function of the first parent node in the method embodiment shown in FIG. 11, the transceiver unit 1520 is configured to receive fourth configuration information and first indication information from a donor node, where the fourth configuration information indicates a resource type of a distributed unit DU of a first node, and the first indication information indicates a time domain position of an unavailable resource for a DU of the first parent node of the first node; and the processing unit 1510 is configured to determine a third resource based on the fourth configuration information and the first indication information, where the third resource is a resource for communication between a mobile termination MT of the first node and the first parent node.

In response to the communication apparatus 1500 being configured to implement the function of the first node in the method embodiment shown in FIG. 14, the processing unit 1510 is configured to determine first information and second information, where the first information indicates a multiplexing capability between a carrier of a mobile termination MT of the first node and a cell of a distributed unit DU of the first node, and an identifier of a first parent node of the first node, and the second information indicates the multiplexing capability between the carrier of the MT of the first node and the cell of the DU of the first node, and an identifier of a second parent node of the first node; and the transceiver unit 1520 is configured to send the first information and the second information.

In response to the communication apparatus 1500 being configured to implement the function of the donor node in the method embodiment shown in FIG. 14, the transceiver unit 1520 is configured to receive first information and second information sent by a first node, where the first information indicates a multiplexing capability between a carrier of a mobile termination MT of the first node and a cell of a distributed unit DU of the first node, and an identifier of a first parent node of the first node, and the second information indicates the multiplexing capability between the carrier of the MT of the first node and the cell of the DU of the first node, and an identifier of a second parent node of the first node; and the processing unit 1510 is configured to perform resource configuration on the first node based on the first information and the second information.

For more detailed descriptions of the processing unit 1510 and the transceiver unit 1520, directly refer to related descriptions in the method embodiments shown in FIG. 8, FIG. 11, and FIG. 14, and details are not described herein again.

As shown in FIG. 16, the communication apparatus 1600 includes a processor 1610 and an interface circuit 1620. The processor 1610 and the interface circuit 1620 are coupled to each other. The interface circuit 1620 is a transceiver or an input/output interface. Optionally, the communication apparatus 1600 further includes a memory 1630, configured to store instructions executed by the processor 1610, or input data used by the processor 1610 to run the instructions, or data generated after the processor 1610 runs the instructions.

In response to the communication apparatus 1600 being configured to implement the methods shown in FIG. 8, FIG. 11, and FIG. 14, the processor 1610 is configured to perform the function of the processing unit 1510, and the interface circuit 1620 is configured to perform the function of the transceiver unit 1520.

In response to the communication apparatus being a chip used in a first node, the chip implements the function of the first node in the foregoing method embodiments. The chip receives information from another module (for example, a radio frequency module or an antenna) in the first node, where the information is sent by a donor node to the first node. Alternatively, the chip sends information to another module (for example, a radio frequency module or an antenna) in the first node, where the information is sent by the first node to a donor node, a first parent node, or a second parent node.

In response to the communication apparatus being a chip used in a donor node, the chip implements the function of the donor node in the foregoing method embodiments. The chip receives information from another module (for example, a radio frequency module or an antenna) in the donor node, where the information is sent by a first node to the donor node. Alternatively, the chip sends information to another module (for example, a radio frequency module or an antenna) in the donor node, where the information is sent by the donor node to a first node, a first parent node, or a second parent node.

The processor in at least one embodiment is a central processing unit (Central Processing Unit, CPU), is another general-purpose processor, a digital signal processor (Digital Signal Processor, DSP), an application-specific integrated circuit (Application-Specific Integrated Circuit, ASIC), a field programmable gate array (Field Programmable Gate Array, FPGA), another programmable logic device, a transistor logic device, a hardware component, or any combination thereof. The general-purpose processor is a microprocessor or any conventional processor.

The method steps in at least one embodiment are implemented in a hardware manner, or is implemented in a manner of executing software instructions by the processor. The software instructions includes a corresponding software module. The software module is stored in a random access memory (Random Access Memory, RAM), a flash memory, a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), a register, a hard disk, a removable hard disk, a CD-ROM, or any other form of storage medium well-known in the art. For example, a storage medium is coupled to a processor, so that the processor reads information from the storage medium or write information into the storage medium. Certainly, the storage medium is a component of the processor. The processor and the storage medium are located in an ASIC. In addition, the ASIC is located in the first node, the donor node, or the first parent node. Certainly, the processor and the storage medium exist in the first node, the donor node, or the first parent node as discrete components.

All or some of the foregoing embodiments are implemented by using software, hardware, firmware, or any combination thereof. In response to software being used to implement embodiments, all or some of embodiments are implemented in a form of a computer program product. The computer program product includes one or more computer programs or instructions. In response to the computer programs or the instructions being loaded and executed on a computer, all or some of the procedures or functions according to at least one embodiment are implemented. The computer is a general-purpose computer, a dedicated computer, a computer network, or another programmable apparatus. The computer programs or the instructions is stored in a computer-readable storage medium, or is transmitted through the computer-readable storage medium. The computer-readable storage medium and is any usable medium accessible by a computer, or a data storage device such as a server integrating one or more usable media. The usable medium is a magnetic medium, for example, a floppy disk, a hard disk, or a magnetic tape; or is an optical medium, for example, a DVD; or is a semiconductor medium, for example, a solid-state drive (solid-state drive, SSD).

In at least one embodiment, unless otherwise stated or there is a logic conflict, terms and/or descriptions between different embodiments are consistent and are mutually referenced, and technical features in different embodiments are combined based on an internal logical relationship thereof, to form a new embodiment.

In at least one embodiment, "at least one" means one or more, and "a plurality of" means two or more. The term "and/or" describes an association relationship between associated objects and may represent three relationships. For example, A and/or B may represent the following cases: Only A exists, both A and B exist, and only B exists, where A and B is singular or plural. The symbol "/" in the text description of embodiments described herein generally represents an "or" relationship between the associated objects. In a formula of at least one embodiment, the symbol "/" represents a "division" relationship between the associated objects.

Various numbers in at least one embodiment are merely used for differentiation for ease of description, and are not used to limit the scope of embodiments described herein. The sequence numbers of the foregoing processes do not mean an execution sequence, and the execution sequence of the processes are determined based on functions and internal logic of the processes.

A person of ordinary skill in the art is aware that, in combination with the examples described in embodiments disclosed in this specification, units and algorithm steps are implemented by electronic hardware or a combination of computer software and electronic hardware. Whether the functions are performed by hardware or software depends on particular applications and design constraints of the technical solutions. In at least one embodiment, a person skilled in the art uses a different method to implement the described functions for a particular application, but the implementation goes beyond the scope of embodiments described herein.

For the purpose of convenient and brief description, for a detailed working process of the foregoing system, apparatus, and unit, refer to a corresponding process in the foregoing method embodiments, and details are not described herein again.

In the several embodiments provided in at least one embodiment, the disclosed system, apparatus, and method are implemented in other manners. For example, the described apparatus embodiments are merely examples. For example, division into the units is merely logical function division. During actual implementation, another division manner is used. For example, a plurality of units or components are combined or integrated into another system, or some features are ignored or not performed. In addition, the displayed or discussed mutual couplings or direct couplings or communication connections are implemented through some interfaces. The indirect couplings or communication connections between the apparatuses or units are implemented in electrical, mechanical, or another form.

The units described as separate parts may or may not be physically separate, and parts displayed as units may or may not be physical units, are located in one position, or are distributed on a plurality of network units. Some or all of the units are selected based on achieving the objectives of the solutions of embodiments.

In addition, function units in at least one embodiment are integrated into one processing unit, or the units exist alone physically, or two or more units are integrated into one unit.

In response to the functions being implemented in a form of a software function unit and sold or used as an independent product, the functions are stored in a computer-readable storage medium. Based on such an understanding, the technical solutions, or the part contributing to the conventional technology, or some of the technical solutions are implemented in a form of a software product. The computer software product is stored in a storage medium, and includes several instructions for indicating a computer device (which is, for example, a personal computer, a server, or a network device) to perform all or some of the steps of the methods described in at least one embodiment. The foregoing storage medium includes any medium that stores program code, such as a USB flash drive, a removable hard disk, a read-only memory (read-only memory, ROM), a random access memory (random access memory, RAM), a magnetic disk, or an optical disc.

The foregoing descriptions are merely specific implementations of at least one embodiment, but are not intended to limit the protection scope of embodiments described herein. Any variation or replacement readily figured out by a person skilled in the art within the technical scope disclosed herein fall within the protection scope of described embodiments. Therefore, the protection scope of embodiments described herein are subject to the protection scope of the claims.

The invention claimed is:

1. A communication apparatus, wherein the apparatus comprises:
   a transceiver, configured to receive fourth configuration information, first indication information, and second indication information, wherein
      the fourth configuration information indicates a resource type of a distributed unit (DU) of a first node,
      the first indication information indicates a first unavailable resource of a first link between a first parent node of the first node and the first node, and
      the second indication information indicates a second unavailable resource of a second link between a second parent node of the first node and the first node; and
   a processor, configured to:
      determine a third resource based on the fourth configuration information and the first indication information, wherein the third resource is a resource for communication between a mobile termination (MT) of the first node and the first parent node, and
      determine a fourth resource based on the fourth configuration information and the second indication information, wherein the fourth resource is a resource for communication between the MT of the first node and the second parent node.

2. The apparatus according to claim 1, wherein
   the transceiver is configured to receive a first dynamic resource indication from the first parent node and a second dynamic resource indication from the second parent node, and
   in response to both the first dynamic resource indication and the second dynamic resource indication indicating that a fifth time domain resource is an available resource, the processor is configured to determine the fifth time domain resource is an available resource of the DU of the first node.

3. The apparatus according to claim 2, wherein the apparatus is the first node and comprises the transceiver and the processor.

4. The apparatus according to claim 1, wherein the apparatus is the first node and comprises the transceiver and the processor.

5. The apparatus according to claim 4, wherein the transceiver of the first node is configured to receive the fourth configuration information, the first indication information and the second indication information from a donor node with which the first node is communicated through the first parent node and the second parent node in parallel.

6. The apparatus according to claim 5, wherein at least one of
   the first indication information received by the first node from the donor node indicates a first link-level unavailable resource configured for the first parent node, the first link-level unavailable resource applicable only to the first link between the first parent node and the first node, or
   the second indication information received by the first node from the donor node indicates a second link-level unavailable resource configured for the second parent node, the second link-level unavailable resource applicable only to the second link between the second parent node and the first node.

7. The apparatus according to claim 5, wherein at least one of
   the first indication information received by the first node from the donor node indicates a first link-level unavailable resource configured for the first parent node, wherein the first link-level unavailable resource is unavailable only to the first link between the first parent node and the first node and is available for another link, or
   the second indication information received by the first node from the donor node indicates a second link-level unavailable resource configured for the second parent node, wherein the second link-level unavailable resource is unavailable only to the second link between the second parent node and the first node and is available for another link.

8. The apparatus according to claim 5, wherein
the transceiver is configured to receive from the first parent node a first dynamic resource indication which indicates whether a fifth time domain resource is an available resource for the DU of the first node,
the first indication information received by the first node from the donor node indicates a first link-level unavailable resource configured for the first parent node, wherein the first link-level unavailable resource is unavailable only to the first link between the first parent node and the first node and is available for another link, and
in response to the first indication information indicating the first link-level unavailable resource, the processor is configured to ignore the first dynamic resource indication received from the first parent node.

9. The apparatus according to claim 8, wherein
the transceiver is configured to receive from the second parent node a second dynamic resource indication which indicates whether a fifth time domain resource is an available resource for the DU of the first node,
the second indication information received by the first node from the donor node indicates a second link-level unavailable resource configured for the second parent node, wherein the second link-level unavailable resource is unavailable only to the second link between the second parent node and the first node and is available for another link, and
in response to the second indication information indicating the second link-level unavailable resource, the processor is configured to ignore the second dynamic resource indication received from the second parent node.

10. The apparatus according to claim 1, wherein:
the first indication information indicates a first time domain position of an unavailable resource for a DU of the first parent node; and
the second indication information indicates a second time domain position of an unavailable resource for a DU of the second parent node.

11. The apparatus according to claim 10, wherein the first time domain position of the unavailable resource for the DU of the first parent node as indicated by the first indication information is different from the second time domain position of the unavailable resource for the DU of the second parent node as indicated by the second indication information.

12. The apparatus according to claim 1, wherein the first node receives a notification of at least one of:
a first correspondence between a DU cell of one of the first parent node or the second parent node, and an MT component carrier of the first node,
a second correspondence between the DU cell of the one of the first parent node or the second parent node, and an MT serving cell of an IAB node, wherein the IAB node is the first node, or
a third correspondence between the DU cell of the one of the first parent node or the second parent node, and the DU cell of the IAB node, wherein the IAB node is the first node.

13. A communication apparatus, wherein the apparatus comprises:
a processor, configured to determine fourth configuration information, first indication information, and second indication information, wherein
the fourth configuration information indicates a resource type of a distributed unit (DU) of a first node,
the first indication information indicates a first unavailable resource of a first link between a first parent node of the first node and the first node, and
the second indication information indicates a second unavailable resource of a second link between a second parent node of the first node and the first node; and
a transceiver, configured to:
send the fourth configuration information, the first indication information, and the second indication information to the first node,
send the fourth configuration information and the first indication information to the first parent node, and
send the fourth configuration information and the second indication information to the second parent node.

14. The apparatus according to claim 13, wherein:
the first indication information indicates a first time domain position of an unavailable resource for a DU of the first parent node; and
the second indication information indicates a second time domain position of an unavailable resource for a DU of the second parent node.

15. The apparatus according to claim 14, wherein the first time domain position of the unavailable resource for the DU of the first parent node as indicated by the first indication information is different from the second time domain position of the unavailable resource for the DU of the second parent node as indicated by the second indication information.

16. The apparatus according to claim 13, wherein the first node receives a notification of at least one of:
a first correspondence between a DU cell of one of the first parent node or the second parent node, and an MT component carrier of the first node,
a second correspondence between the DU cell of the one of the first parent node or the second parent node, and an MT serving cell of an IAB node, wherein the IAB node is the first node, or
a third correspondence between the DU cell of the one of the first parent node or the second parent node, and the DU cell of the IAB node, wherein the IAB node is the first node.

17. The apparatus according to claim 13, wherein the apparatus is a donor node which comprises the transceiver and the processor, and with which the first node is communicated through the first parent node and the second parent node in parallel.

18. The apparatus according to claim 17, wherein at least one of
the first indication information sent to the first node from the donor node indicates a first link-level unavailable resource configured for the first parent node, the first link-level unavailable resource applicable only to the first link between the first parent node and the first node, or
the second indication information sent to the first node from the donor node indicates a second link-level unavailable resource configured for the second parent node, the second link-level unavailable resource applicable only to the second link between the second parent node and the first node.

19. A system, comprising:
a first node;
a first parent node;
a second parent node; and
a donor node with which the first node is communicated through the first parent node and the second parent node in parallel, wherein
the donor node is configured to
   determine fourth configuration information, first indication information, and second indication information, wherein
     the fourth configuration information indicates a resource type of a distributed unit (DU) of the first node,
     the first indication information indicates a first unavailable resource of a first link between the first parent node and the first node, and
     the second indication information indicates a second unavailable resource of a second link between the second parent node and the first node,
   send the fourth configuration information, the first indication information, and the second indication information to the first node,
   send the fourth configuration information and the first indication information to the first parent node, and
   send the fourth configuration information and the second indication information to the second parent node, and
the first node is configured to
   receive the fourth configuration information, the first indication information and the second indication information from the donor node,
   determine a third resource based on the fourth configuration information and the first indication information, wherein the third resource is a resource for communication between a mobile termination (MT) of the first node and the first parent node, and
   determine a fourth resource based on the fourth configuration information and the second indication information, wherein the fourth resource is a resource for communication between the MT of the first node and the second parent node.

20. The system according to claim 19, wherein
the first node is configured to
   receive a first dynamic resource indication from the first parent node,
   receive a second dynamic resource indication from the second parent node, and
   in response to both the first dynamic resource indication and the second dynamic resource indication indicating that a fifth time domain resource is an available resource, determine the fifth time domain resource is an available resource of the DU of the first node.

* * * * *

UNITED STATES PATENT AND TRADEMARK OFFICE
CERTIFICATE OF CORRECTION

PATENT NO. : 12,335,925 B2
APPLICATION NO. : 17/886801
DATED : June 17, 2025
INVENTOR(S) : Fengwei Liu and Jing Qiu Page 1 of 1

It is certified that error appears in the above-identified patent and that said Letters Patent is hereby corrected as shown below:

On the Title Page

Item (57) should read: A resource configuration method and a communication apparatus. A donor node configures different DU resource configurations for an IAB node and two parent nodes of the IAB, so that the IAB node determines MT resources for different parent nodes based on the different DU resource configurations, to implement resource configuration of the IAB node in a dual connectivity scenario.

Signed and Sealed this
Ninth Day of September, 2025

Coke Morgan Stewart
*Acting Director of the United States Patent and Trademark Office*